(12) United States Patent
Brutoco et al.

(10) Patent No.: US 12,649,588 B2
(45) Date of Patent: Jun. 9, 2026

(54) SYSTEM, METHOD AND APPARATUS FOR AIRSHIP MANUFACTURE USING ROBOTICS

(71) Applicant: H2 Clipper, Inc., Santa Barbara, CA (US)

(72) Inventors: Rinaldo S. Brutoco, Santa Barbara, CA (US); Robert H. Shelton, Santa Barbara, CA (US); Michael R. Everman, Santa Barbara, CA (US)

(73) Assignee: H2 Clipper, Inc., Santa Barbara, CA (US)

( * ) Notice: Subject to any disclaimer, the term of this patent is extended or adjusted under 35 U.S.C. 154(b) by 0 days.

(21) Appl. No.: 19/035,332

(22) Filed: Jan. 23, 2025

(65) Prior Publication Data

US 2025/0340310 A1 Nov. 6, 2025

Related U.S. Application Data

(63) Continuation of application No. 18/488,128, filed on Oct. 17, 2023, now Pat. No. 12,234,035, which is a
(Continued)

(51) Int. Cl.
B64F 5/10 (2017.01)
B64B 1/08 (2006.01)

(52) U.S. Cl.
CPC ................. B64F 5/10 (2017.01); B64B 1/08 (2013.01)

(58) Field of Classification Search
CPC ..... B64F 5/10; B64F 5/00; B64B 1/08; B64B 1/06; B64B 1/00; B64C 1/068;
(Continued)

(56) References Cited

U.S. PATENT DOCUMENTS 1,559,807 A 11/1925 Thaden
3,488,019 A * 1/1970 Sonstegaard ............. B64B 1/00
244/128
(Continued)

FOREIGN PATENT DOCUMENTS

CN 111232237 A 6/2020
EP 3135441 A1 3/2017
(Continued)

OTHER PUBLICATIONS

William Doggett (NASA Langley Research Center), "Robotic Assembly of Truss Structures for Space Systems and Future Research Plans," Proceedings of IEEE Aerospace Conference, Mar. 2002.
(Continued)

*Primary Examiner* — Lawrence Averick
(74) *Attorney, Agent, or Firm* — Day Pitney LLP; John C. Serio

(57) ABSTRACT

A system, method and apparatus are proposed to assist in assembling the frame, attaching the skin, and performing other tasks in manufacturing an airship and constructing other structures that are otherwise challenging, inefficient, or unsuitable for humans to perform, and/or that traditionally require significant investments in capital intensive manufacturing facilities. Several embodiments are proposed in which these and other recurring manufacturing tasks can be performed safely and efficiently with the assistance of autonomous, semi-autonomous, and/or human-directed robots, acting independently and in robot swarms.

10 Claims, 9 Drawing Sheets

Related U.S. Application Data continuation of application No. 18/056,399, filed on Nov. 17, 2022, now Pat. No. 11,851,214.

(60) Provisional application No. 63/280,368, filed on Nov. 17, 2021.

(58) Field of Classification Search
CPC .......... B64C 1/06; B64C 1/00; B25J 15/0066; B25J 15/0052; B25J 15/00; B23P 19/04; B23P 19/00; B23P 2700/01; B29L 2031/3082; B29L 2031/3076; B29L 2031/30; B29L 2031/00; Y10T 29/49904; Y10T 29/49828
See application file for complete search history.

(56) References Cited

U.S. PATENT DOCUMENTS

| | | | | | |
|---|---|---|---|---|---|
| 3,844,507 | A | * | 10/1974 | Papst | B64B 1/62 244/30 |
| 3,972,492 | A | * | 8/1976 | Milne | B64B 1/06 244/128 |
| 4,009,850 | A | * | 3/1977 | Hickey | B64F 1/14 244/125 |
| 4,259,776 | A | * | 4/1981 | Roda | B64B 1/06 29/469 |
| 4,945,488 | A | * | 7/1990 | Carver | G05B 19/41805 700/182 |
| 7,343,222 | B2 | * | 3/2008 | Solomon | G05D 1/0088 901/1 |
| 8,894,002 | B2 | * | 11/2014 | Goelet | B64B 1/005 244/30 |
| 8,899,514 | B2 | * | 12/2014 | Goelet | B64B 1/16 244/30 |
| 9,302,758 | B2 | * | 4/2016 | Kraus | B64B 1/08 |
| 9,828,082 | B2 | * | 11/2017 | Goelet | B64B 1/16 |
| 10,214,275 | B2 | * | 2/2019 | Goehlich | B64C 1/00 |
| 10,232,897 | B2 | | 3/2019 | Hafenrichter et al. | |
| 10,450,047 | B2 | * | 10/2019 | Heppe | B29C 65/70 |
| 10,596,627 | B2 | * | 3/2020 | Goehlich | B64F 5/10 |
| 10,988,226 | B2 | * | 4/2021 | Brin | F16B 7/044 |
| 11,066,145 | B1 | | 7/2021 | Brutoco et al. | |
| 11,247,349 | B2 | * | 2/2022 | Miller | B25J 9/0009 |
| 11,254,408 | B2 | * | 2/2022 | Amezquita Zatarain | B64B 1/08 |
| 11,353,856 | B2 | * | 6/2022 | Rudnitsky | G05B 19/4097 |
| 11,358,337 | B2 | * | 6/2022 | Czinger | G05B 19/41815 |
| 2011/0052845 | A1 | * | 3/2011 | Dermond | B29C 53/66 156/185 |
| 2012/0018571 | A1 | * | 1/2012 | Goelet | B64B 1/22 244/30 |
| 2013/0277496 | A1 | * | 10/2013 | Kraus | B64B 1/08 244/125 |
| 2014/0367519 | A1 | * | 12/2014 | Goehlich | B22F 7/062 244/119 |
| 2016/0368582 | A1 | * | 12/2016 | Heppe | G01M 3/16 |
| 2017/0066143 | A1 | * | 3/2017 | Häntzschel | B25J 15/0066 |
| 2017/0240298 | A1 | * | 8/2017 | Goehlich | B29C 64/106 |
| 2018/0339456 | A1 | * | 11/2018 | Czinger | B29C 64/379 |
| 2019/0002130 | A1 | * | 1/2019 | Whitlaw | B25J 9/0036 |
| 2019/0112023 | A1 | | 4/2019 | Brin et al. | |
| 2020/0254630 | A1 | * | 8/2020 | Miller | H02G 11/00 |
| 2021/0122453 | A1 | * | 4/2021 | Amezquita Zatarain | B64F 5/10 |
| 2022/0339875 | A1 | * | 10/2022 | Czinger | B33Y 10/00 |
| 2023/0211866 | A1 | * | 7/2023 | Barthe | B64B 1/08 244/30 |

FOREIGN PATENT DOCUMENTS

| | | |
|---|---|---|
| WO | 2021014082 A1 | 1/2021 |
| WO | 2021081544 A1 | 4/2021 |

OTHER PUBLICATIONS

Robert Hoyt, et al., "SpiderFab: Process for On-Orbit Construction of Kilometer-Scale Apertures," Tethers Unlimited, Inc. Final Report to NASA Innovative Advanced Concepts, Feb. 29, 2016.

Nicholas Lee, et.al . . . "Robot Would Assemble Modular Telescope—In Space," SPIE: The International Society for Optics and Photonics, Jul. 12, 2016.

Karl-Lydie Jean-Baptiste (MIT), "Robots Assemble Large Structures from Little Pieces," Tech Briefs Engineering Solutions for Design & Manufacturing, Feb. 1, 2020.

Gregg Profozich, "Ready or Not, Robotics in Manufacturing is on the Rise," CMTC: California Marnufacturing Technology Consulting (CMTC), Apr. 7, 2021.

Arrival Robotics Limited, "Arrival Micro Factory Documentary", YouTube Video (Transcript), Feb. 19, 2022.

Robotworx, "Robots in the Aerospace Industry" (online article), Undated.

Sonstegaard, Miles, "Airships for Transporting Highly Volatile Commodities," MIT Proceedings of the Interagency Workshop on Lighter than Air Vehicles, Jan. 1, 1975 (Acquired by NTRS-NASA Technical Reports Server, Aug. 8, 2013), pp. 551-558. [https://ntrs.nasa.gov/citations/19760007973].

Lobner, Peter, "Shell/Aerospace Developments—Methane gas transporter," Modern Airships, Mar. 8, 2022.

EP Search Report corresponding to Application No. 22896714.7, dated Jul. 10, 2025, 15 pages.

Extended European Search Report in corresponding EP application No. 22896714.7 dated Oct. 1, 2025.

* cited by examiner

FIG. 2

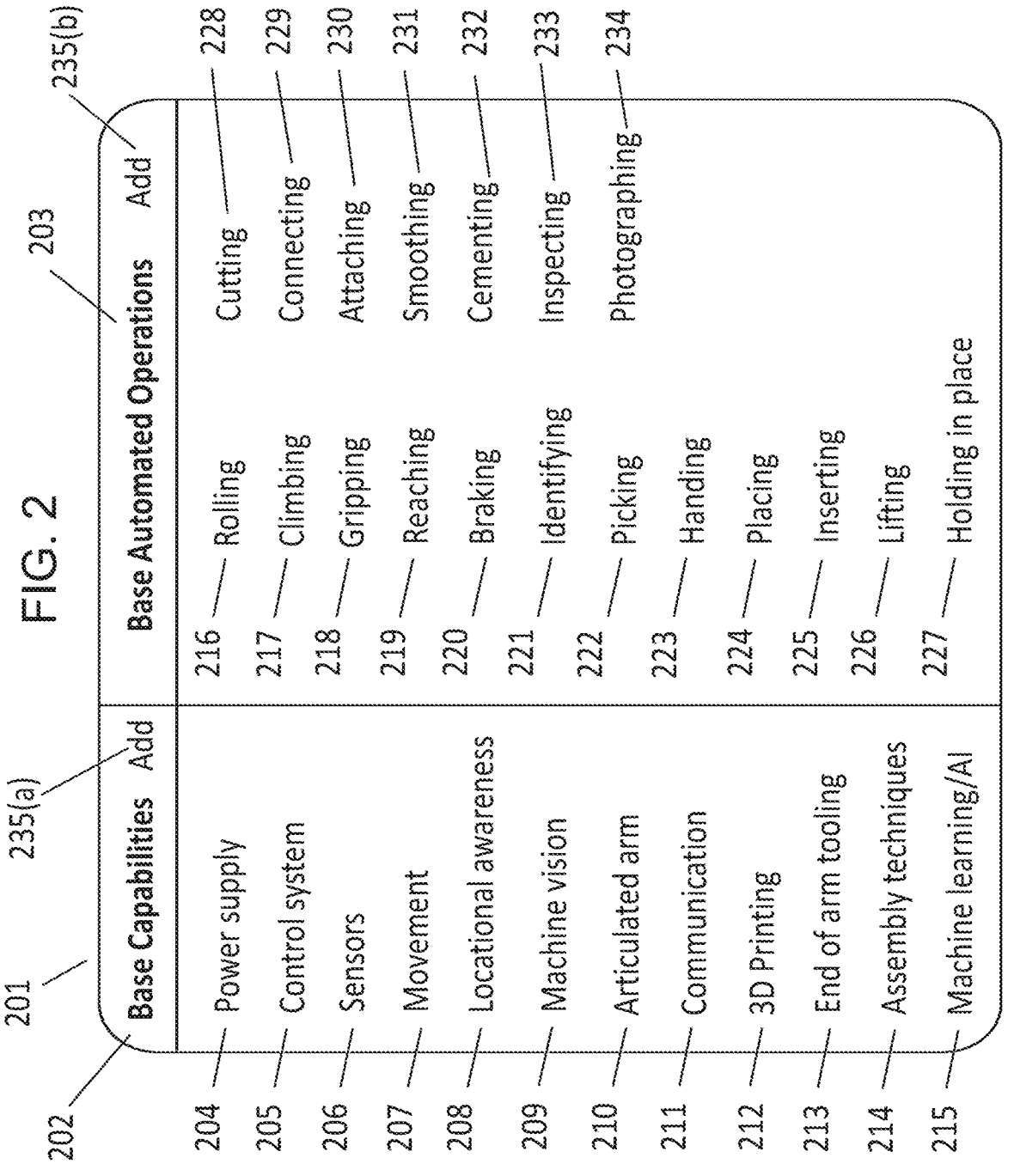

| Base Capabilities    Add | Base Automated Operations    Add |
|---|---|
| 204 — Power supply | 216 — Rolling | 228 — Cutting |
| 205 — Control system | 217 — Climbing | 229 — Connecting |
| 206 — Sensors | 218 — Gripping | 230 — Attaching |
| 207 — Movement | 219 — Reaching | 231 — Smoothing |
| 208 — Locational awareness | 220 — Braking | 232 — Cementing |
| 209 — Machine vision | 221 — Identifying | 233 — Inspecting |
| 210 — Articulated arm | 222 — Picking | 234 — Photographing |
| 211 — Communication | 223 — Handing | |
| 212 — 3D Printing | 224 — Placing | |
| 213 — End of arm tooling | 225 — Inserting | |
| 214 — Assembly techniques | 226 — Lifting | |
| 215 — Machine learning/AI | 227 — Holding in place | |

201    202    235(a)    203    235(b)

(A-A detail)

(A-A detail)

(A-A detail)

SYSTEM, METHOD AND APPARATUS FOR AIRSHIP MANUFACTURE USING ROBOTICS

CROSS-REFERENCE TO RELATED APPLICATIONS

This application claims the benefit of U.S. patent application Ser. No. 18/488,128, filed Oct. 17, 2023 (now U.S. Pat. No. 12,234,035), which claims the benefit of U.S. patent application Ser. No. 18/056,399, filed Nov. 17, 2022 (now U.S. Pat. No. 11,851,214), which claims priority under 35 U.S.C. § 119(e) to U.S. Provisional Application No. 63/280,368, filed on Nov. 17, 2021, entitled, "SYSTEM, METHOD AND APPARATUS FOR AIRSHIP MANUFACTURE USING ROBOTICS". The entire contents of this patent application are hereby incorporated by reference herein.

BACKGROUND

Technical Field of the Subject Technology

The subject technology relates to the construction of lighter-than-air airships and other large aviation and aerospace structures that are tall, long, wide, and/or extremely heavy, and which therefore tend to render construction using traditional systems and methods challenging, inefficient, or generally unsuitable for humans to perform, and/or that otherwise require significant investments to be made in very capital-intensive manufacturing facilities and equipment.

Description of the Prior Art

Airships are well known in the art. A rigid or semi-rigid airship or dirigible is a steerable airship with a structural framework that maintains the shape of the airship and carries its structural loads, and with the lift provided by inflating one or multiple interior bags or compartments with a lighter-than-air gas such as hydrogen or helium. To obtain sufficient benefit from such lift to carry commercial payloads, airships are traditionally very large. For example, the Graf Zeppelin, which operated commercially from 1928 to 1937, was 776 feet long and had a diameter of over 100 feet. To be capable of carrying meaningful payloads, future commercial airships are likely to also be quite large, resulting in significant manufacturing challenges using traditional methods.

Historically, airships have been constructed around a keel, although Applicant's prior patent applications including Ser. No. 13/855,923, filed on Apr. 3, 2013, now U.S. Pat. No. 9,102,391 (the '391 patent), and Ser. No. 17/005,628, filed on Aug. 28, 2020, now U.S. Pat. No. 11,066,145 (the '145 patent), disclose an exoskeleton comprised of a series of triangular structures formed from hubs and spokes. The relevant content from such earlier '391 and '145 patents are incorporated in their entirety herein by this reference.

As indicated in the '145 patent, Applicant contemplates that a commercial-sized airship may be approximately 1000 feet in length and 200 feet in diameter. In such case, just the airship's exoskeleton and skin surface material will weigh over 250,000 pounds. Such structural systems and skin require extensive assembly and lay-up, which if pursued using traditional means, would create high demands for capital to construct specialized manufacturing facilities and equipment, create challenges, inefficiencies and safety risks for workers, and result in significant limitations to rapidly expanding, replicating, or scaling up such facilities to manufacture many such airships.

Although for illustrative purposes, this application focuses on a dirigible, and in particular an airship such as disclosed in the '145 patent, the principles it discloses are relevant to other airships and large aviation and aerospace structures including, without limitation, the fuselage of commercial fixed-wing aircraft and the body of commercial rockets that encounter similar issues during construction due to their height, length, diameter, and mass. For example, SpaceX's Falcon Heavy rocket is 230 feet tall, 40 feet in diameter, and reportedly weighs over 60,000 pounds without fuel. Even larger rockets are likely to be required in the future for interplanetary missions, the manufacturing challenges of which will inevitably become more difficult using traditional methods.

Traditionally in the aviation, aerospace and other industries involving construction of very large structures, manufacturing facilities employ overhead cranes, elevated work platforms, complex assembly lines, and require specialized equipment to lift, move, and work on such structures during construction. This in turn results in highly specialized and capital-intensive infrastructure, safety concerns, and time-consuming, costly, and difficult manufacturing processes.

U.S. Pat. No. 4,259,776, entitled "Method of Assembly of Airship Hull," which was filed on Aug. 9, 1978; issued to Airships International, Inc. on Apr. 7, 1981; and that expired on or about Aug. 9, 1998 (the '776 patent), contains a description of the various methods that have been used in the past to assemble or erect large rigid airships, which description is included herein by this reference. As summarized in the background provided to patent application Ser. No. 16/156,913, filed on Oct. 10, 2018, now U.S. Pat. No. 10,988,226 (the '226 patent), issued to Sergey Brin, Alan Weston, et.al. and assigned to LTA Research and Exploration LLC, traditionally airships are kept stationary while being built, which meant that builders must climb to great heights or be suspended at great heights to build airships.

To overcome this limitation, the '776 and '226 patents each disclose a method of rotating the airship structure, so the work area has the highest degree of accessibility, convenience, and safety for the personnel involved in the assembly, while at the same time retaining the precise alignment of the components of the hull being assembled. The '776 patent discloses assembly of the principal transverse frames of the hull in the horizontal position, and on completion, raising and placing the two frames in a "vertical orientation on an endless belt of air cushions supported on a rotating cradle." One or more such rotating cradles are then used during installation to rotate the frames and temporary structure assembly to convenient positions with the air cushions being monitored for pressure, with adjustments being made to provide adequate support.

The '226 patent discloses use of a "rollercoaster jig" structure to allow an airship (or partially completed portions of it) to be rotated by adding detachable wheels or rollers to the outer surface of a circular mainframe structure, such wheels being designed "to interface the mainframe with the Rollercoaster's rails and allow the mainframe to rotate along its axis" while the airship is built so that builders "may stay grounded," thereby improving safety and enabling greater assembly speed. The system, method and apparatuses disclosed in the '226 patent are complemented within U.S. Pat. No. 11,254,408 to Jesus Zatarain, et. al, also assigned to LTA Research (the '408 patent). The '408 patent describes use of a "universal jig" to construct the large circular mainframes of the airship hull while each frame is oriented in a horizontal position; and then once adequately completed structurally, the partially assembled mainframe is erected and placed onto the rollercoaster jig disclosed in LTA's '226 patent.

A third patent disclosure, Chinese patent application number CN 111232237A, entitled "Framework of large hard airship and method for mounting parts outside air bag of large hard airship," filed by Beijing Kongtiangao Technology Co Ltd on Mar. 4, 2020 (the '237 patent application), also contemplates rotating the airship to position the work area to be on the portion of the hull nearest to the factory floor. In the '237 patent application, the airship is lifted by a "process air column below the airship," and then uses manpower or a stepping motor connected to "rotating slings at the two sides of the airship" to roll the airship with the aim of conveniently installing the structure and equipment parts of the airship at the lower position, to thereby increase safety, reduce cost, and avoid the need for expensive lifting platforms and complex scaffolding.

Heretofore, airship construction has not involved extensive use of robotics. LTA's '408 patent mentions robots only twice, and then simply as a possible alternative operator to assist in assembling the mainframe while the circular mainframes rest on its universal jig device. More generally, however, as described in an April 2021 article by CMTC (California Manufacturing Technology Consulting) entitled "Ready or Not, Robotics in Manufacturing is on the Rise," as industrial robots become faster, smarter, and cheaper, more and more companies are beginning to integrate them into their workflow in conjunction with their workforce. Dating back to the early-1990's, NASA, JPL, and various research groups including MIT and the California Institute of Technology have experimented with the use of robots for assembling large truss structures in outer space for the International Space Station, extremely large telescopes, and other remotely constructed structures and space habitats.

As summarized in the 2002 article by William Doggett, entitled "Robotic Assembly of Truss Structures for Space Systems and Future Research Plans," NASA's Automated Structural Assembly Laboratory (ASAL) demonstrated reliable autonomous assembly and disassembly of an 8-meter planar structure composed of 102 truss elements covered by 12 panels. The Doggett paper summarizes associated literature regarding fully autonomous and telerobotic systems for in-space assembly operations, inspection, and maintenance. The Doggett paper, which is incorporated herein by this reference, summarizes the critical hardware, software, and design philosophy that form the foundation for reliable assembly systems for such planar structures.

On-orbit fabrication and integration of spacecraft components was also investigated by Tethers Unlimited, a contractor to NASA's Innovative Advanced Concepts (NIAC) program. It this work, Tethers demonstrated the feasibility of extruding and assembling composite truss-based structures and enabling robotic systems to perform assembly of these structures in a highly automated manner. In proof-of-concept demonstrations of its so called SpiderFab robots, NIAC tested custom robot end-effectors and truss joints; verified the ability of the autonomous robots to grasp, manipulate, and join trusses; and employed a robotic vision system to enable closed-loop control of the assembly to support these functions. Tethers' 2016 final report regarding this work, entitled "SpiderFab: Process for On-Orbit Construction of Kilometer Scale Apertures," is also incorporated herein by reference.

The CMTC article lists six major types of robotics: articulated, Cartesian, cylindrical, spherical, Selective Compliance Assembly Robot Arm (SCARA), and delta robots.

The article also describes the attributes and types of work for which these types of industrial robotics are respectively best suited. In addition, the CMTC article describes the applications for which robots are typically used in manufacturing. These applications include welding, painting, pick & place, packaging & labeling, assembly & disassembly, product inspection, product testing, palletizing, polishing, grinding, and buffing. Other articles summarize these and other tasks as falling within five general categories: materials handling, welding, assembly, dispensing, and processing. Given the advancements in robotic automation, the CMTC article also lists the industries utilizing automation for greater efficiency, productivity, and precision. According to CMTC, these include electronics manufacturing, auto manufacturing, medical, food manufacturing and agriculture.

Although robots are most often associated with the foregoing industries and working with tiny components, they play an important role in aerospace applications. According to RobotWorx, due to their reliability, capability and precision, robots are used extensively for the construction of aircraft engines as well as in performing tasks such as drilling and painting airframes. According to their article "Robots in the Aerospace Industry," the task for which robots are most frequently used in aerospace is drilling holes into components. Painting and inspecting airframes for cracks, de-lamination of composites, and ensuring rivets are intact are also common tasks; and ultrasonic imaging is another common task for robots in aerospace.

According to the RobotWorx article, robots can also be used to lay carbon fiber strips in connection with automated fiber placement on composite fuselages, which helps to eliminate errors due to the robots' greater precision for cutting and placing fiber. As the article indicates, it is generally hoped that the utilization of AI (artificial intelligence) and machine learning in the manufacturing process of aircraft will help to increase the production rate without compromising the quality of the product. Aerospace giants, like Boeing and Airbus, are investing in this technology, and along with the previously referenced research into the use of autonomous robots to construct large structures in outer space, such investments by OEMs are expected to help the market for robotics grow in the future.

There has been considerably less use (or proposed use) of robotics with respect to airship construction. In connection with its hybrid airship program, Lockheed Martin developed U.S. Pat. No. 8,800,628, entitled "Self-propelled airship hull repair system" (the '628 patent) covering its so-called 'Self-Propelled Instruments for Damage Evaluation and Repair,' or SPIDER robot. This robot was programmed to autonomously inspect the airship's skin for holes and to repair them when found. The SPIDER is built with two halves: one half that goes on the exterior of the envelope, and the other on the interior. Magnetically coupled, the robot moves across the entire surface of the envelope, with the outer half shining a light on the airship's surface while the inner half detects potential pinholes using light sensors in the otherwise dark envelope. When SPIDER detects a hole, it can repair it using a patching mechanism, and it then sends before and after photos of the area for repair verification. The robot is designed to operate over a non-uniformly curved surface while also propelling itself up, down, and upside-down in parallel with the airship's final assembly and during major maintenance checks, using optical encoders to measure its movement.

A separate Lockheed Martin patent application that subsequently matured into U.S. Pat. No. 10,518,861, entitled "Continuous fiber reinforcement for airship construction" (the '861 patent), discloses use of a similar robot to the SPIDER disclosed in the '628 patent. In the case of the '861 patent, this robot is proposed as a means for applying continuous fiber reinforcement to a gas-filled shape and thereby eliminating the need for individual structural joints in hull assembly with use of continuous fiber reinforcement across the three-dimensional surface of the airship or aerostat hull. In accordance with the '861 patent disclosure, in certain embodiments, a membrane of thin film or fabric, built in the desired hull shape, is first filled with gas and suspended above the manufacturing facility floor so that reinforcement fibers can be applied to its outer surface using a fiber dispenser robot. As disclosed, this robot may include a power source, a drive sub-system, a positioning sub-system, a damage reporting sub-system and/or a control sub-system; and moves along the surface of the gas filled shape "using wheels, rollers, tracks, balls, or any other types of mechanism that permits motion across the membrane."

As indicated above, in the previously referenced '408 patent, in conjunction with its disclosure of the universal jig, LTA references the use of robots only twice. Thus, its universal jig is described as comprising multiple tracks configured in a radial pattern and carts configured to be positionally adjusted along such tracks to assist in constructing a mainframe of an airship structure. As disclosed therein, each track has a front cart and a back cart on it, whose respective purpose is to secure inner and outer portions of the mainframe during assembly. The specification discloses that these carts may be "utilized to assist with holding various components of mainframes (e.g., joints and connectors), allowing human, robotic, or other assembly operators to assemble a mainframe." The only other reference to robotic assembly in the over 70-page specification is the explanation that "once the first component of the mainframe is secured to a cart [ . . . ] an assembly worker (e.g., a human, mechanical, or robotic assembly worker) may then attach connectors additional joints may then be attached to the connectors. . . . This process of connecting joints and connectors may be repeated until the entire circular mainframe is assembled."

In U.S. Pat. No. 11,353,856, entitled "System and method for flexible manufacturing" (the '856 patent), applicant Arrival Robotics Limited ("Arrival") discloses a process for creating robotic control for manufacturing products. Arrival is reportedly applying the teachings of the '856 patent and related knowhow to employ a microfactory production model to produce commercial electric vehicle vans and buses. According to its materials, "the foundational principle behind microfactories is the use of technology cells," which in turn permit a more flexible assembly method where each technology cell is optimized to perform specific production processes. Arrival estimates that at comparable annual production volumes, the capital investment for its microfactories will be 50% less than a traditional OEM production facility, and its operational expense saving associated with its microfactories will be approximately 50% when compared to a traditional OEM facility with a similar production capacity.

A useful summary of behavior-based robotics, system controls, and decentralized local control, and hybrid robotic architectures, is provided in U.S. Pat. No. 7,343,222, entitled "System, method and apparatus for organizing groups of self-configurable mobile robotic agents in a multi-robotic system" (the '222 patent). The use of such approaches to enable groups of robots, sometimes referred to as robot swarms for reasons described in the '222 patent, to work together and to speed up the process of producing large-scale systems is also described in non-patent literature such as a February 2020 article entitled "Robots assemble large structures from little pieces" written by MIT researchers and published in Motion Design Magazine.

A great need exists for an improved manufacturing system, method and apparatus that will simplify the production of airships and other very large and/or very heavy structures, taking full advantage of such robotic technologies and control methods, to reduce manufacturing time, cost, and capital investment requirements, while simultaneously increasing the speed of moving from product design to actual manufacturing, increasing the levels of precision, and making it much easier to scale-up production from the first commercial airship to enabling production of multiple units and replication of such production facilities in multiple locations.

SUMMARY OF SUBJECT TECHNOLOGY & PARTICULAR EMBODIMENTS

In at least one aspect, the subject technology relates to using specially designed and programmed robots to provide fast and cost-effective ways to construct airships and other large structures with a much lower initial capital investment in facilities and equipment than traditional approaches. The disclosure has utility for assembling the structure and attaching the exterior skin of an airship and will be described in connection with such utility, although other commercial utilities are contemplated without departing from the principles of the subject disclosure.

In some embodiments, a group of robots works at heights of 50 feet or greater, thereby enabling workers to avoid dangerous conditions when performing assembly operations, and through innovative sensory systems permitting automated quality oversight and human supervision from a safe remote location. This combination of experienced technicians overseeing the robotic capabilities of the system and method will yield superior results in a fraction of the time, and at a fraction of the cost of traditional construction, while dramatically reducing the required infrastructure needed for manufacturing operations.

In another embodiment, a special class of heavy lift robots may be used in conjunction with other specialized robot worker classes to permit the airship to be produced from the top down, with the active assembly work surface remaining within a comfortable distance of the manufacturing facility floor. In such an embodiment, as upper sections of the airship are completed, the partially completed hull is pushed upward, making it possible to assemble more of its structure below the completed top, whereupon the process is repeated until the full airship has been assembled. In an illustrative embodiment of this approach, the outside surface material for the airship is attached to the structure as each successive portion of the hull is assembled rather than after the full hull is complete. And in yet an additional illustrative embodiment, other subsystems inside the airship and extending from the outside surface are also added as the working surface of the partially completed hull are added, rather than waiting to add such components until after the entire hull has been physically completed.

In another illustrative embodiment, each robot is controlled by pre-programmed routines and/or through use of sophisticated artificial intelligence (AI) that may be trained to respond to different structural shapes, systems, parts numbering, and markings, including various forms of visual fiducial markers such as AprilTags. By way of example but not limitation, where the airship employs a structure such as the exoskeleton in Applicant's '391 patent and '628 patent application, the robots may be pre-programmed to climb existing structure orient themselves automatically within three-dimensional space so that each structural member will be properly aligned when the structure assembly is completed.

In a further illustrative embodiment, robots utilize remote cameras, computer vision and machine learning to adapt to the geometry of the airship exoskeleton, select and assemble specific parts so that such robots assemble the exoskeleton, attach the exterior skin, and perform other specialized tasks needed to construct the airship or other structure. In addition to labor savings and safety benefits, the use of such robotic technology cells will liberate airship manufacturers from needing to install costly overhead cranes and purchasing or installing additional equipment that would otherwise be required for mass producing airships.

While traditional production assembly solutions (including the use of overhead cranes, assembly equipment, elevated worker platforms, and the "rollercoaster jig" proposed in the '226 patent) involve the use of capital-intensive manufacturing facilities, specialized equipment and personnel, the use of robotic assembly will dramatically speed up building an airship, with each group of robots able to be controlled by an operator standing safely on the ground.

The system and method are also designed with scalability in mind. Because multiple robot classes can be built to work in parallel both in coordinated fashion and on separate tasks or geographic areas, the system is able to be readily scaled on multiple levels to meet the desired project duration regardless of the size of the airship, the number of airships, and the number of assembly locations. The ability to enter multiple markets rapidly, create good paying jobs and add to local tax revenue, will assist in building broad community support and adoption.

In one illustrative embodiment, the system builds the airship structure in a linear fashion, with each robot attaching itself to, and deriving support from, one or multiple rows of hubs and tubes that have already been assembled. In an optional embodiment, one or multiple temporary guide rails that are attached to such pre-assembled components and/or connected to supports that are separate from the airship's own structure provide additional support and/or guidance for the robots. And in another optional embodiment, the system and method employs one or multiple tracks or floor-mounted rails to provide additional support and/or guidance for the robots.

The system and method preferably include a locomotion mechanism for moving along such supporting structure, guide rail(s), and/or track(s). In an optional embodiment, including without limitation when the robot cannot be attached to previously completed portions of the structure, a guide rail or track, movement may be achieved through self-locomotion or autonomous motion bases using battery or hydrogen fuel cell electric power, and/or by being pulled along the guide rail(s) or tracks(s), utilizing wheels, cable crawlers, vacuum suckers, and rack and pinon systems. When elevated off the manufacturing floor, the system and method may optionally include a gantry to hold the robot from a wire cable to protect it against falling. And when operating from the factory floor, the system and method may optionally include linear bearings and recirculating profile rails to enhance load capabilities.

In one illustrative embodiment, the robots are programmed to recognize shapes, respond to visual fiducial markers, and to perceive obstacles through sensors, and to carry out recurring actions based on such sensor data.

In some embodiments, the robots may be programmed to operate independently based on machine vision, or pre-programmed to work as a swarm, wherein a group of two or more robots work in concert with one another, coordinate motions, destinations, and/or actions, to carry-out predetermined tasks. In one preferred embodiment, such autonomous robots are programmed to avoid colliding with other robots, humans and objects based on local processor functions.

In one embodiment, portions of the exoskeleton and sub-assemblies may be constructed in separate processes, that are subsequently combined with other sub-assemblies and partially completed portions of hull. In one such embodiment, portions of the exoskeleton may be assembled while laying on its side until the full circumference is completed, whereupon the section is then raised to an upright position so that it can be connected to other partially completed sections to create a stable base for attaching guide rails and cables. In another embodiment, specially designed robots are used to hold partially completed circular truss sections in a proper vertical orientation while additional modules are added and until the full circumference is completed.

In another embodiment, one or more inflatable shapes may be used, around which the exoskeleton may be constructed by the robots to minimize the need for overhead cranes or intermediate crosswalks to hold the partially built exoskeleton until the full circumference can be completed, thereby enabling the circular shape to distribute the weight of the airship along the full circumference. In another embodiment, such inflatable structures may be used to hold up the partially completed exoskeleton, thereby reducing some portion of the weight that robots holding such structure in place must lift.

In yet another embodiment, to minimize the need for cranes, mechanical and/or hydraulic jacks, and other lifting equipment, the buoyancy of such one or more inflatable shapes may be adjusted to maintain a neutral or desired level of negative buoyancy of the airship or selected portion thereof and so that the weight of such airship or portion thereof always remains in a predetermined acceptable range as construction proceeds.

In certain embodiments such one or more inflatable shapes may be filled with air; in other embodiments such shape(s) may be filled with a lighter-than-air gas such as helium or hydrogen; and in yet another embodiment, each of such one or more inflatable shapes may consist of inflatable layers, an outside layer being filled with lifting gas and an inside layer (also referred to as a "ballonet") being filled with air. In another embodiment, this order is reversed, with the outside layer being filled with air and an inside layer being filled with the lifting gas.

In certain embodiments, an automated control system may be programmed to control the relative quantities of lifting gas and air that is contained in the one or more inflatable shapes, the objective of such control system programming being to continuously monitor the net weight and to maintain the desired buoyancy characteristics of the airship or airship parts by adjusting the quantities of air and lifting gas as construction progresses so as to maintain both the integrity of said one or more inflatable shapes as well as the overall neutral or desired net negative buoyancy level at all times.

In one illustrative embodiment, the net weight of the airship is never more than about 25,000 pounds, notwithstanding that the combined weight of the exoskeleton and skin will eventually reach in exceed 250,000 pounds.

In certain embodiments an outer layer of lightweight fabric such as aramid fiber or Kevlar® is produced in the desired form of the one or more inflated shapes, and placed around the outside surface of such one or more inflatable shapes to reduce the risk of abrasion should they come into contact with the exoskeleton and/or the risk of being damaged during construction; and in one preferred embodiment such one or more inflatable shapes, and this fabric will remain permanently inside the exoskeleton for the lifetime of the airship and serve as the lifting gas compartments and corresponding ballonets, if any, following completion of construction.

In certain embodiments, sleeves are designed in the lightweight fabric draped over the one or more inflatable shapes through which spokes can be threaded during assembly of the exoskeleton to thereby assure that said shapes adhere to the desired portion of the exoskeleton.

And in some illustrative embodiments, the placement of hubs, spokes and other key components may be drawn directly using human and/or machine-readable text or symbols onto the surface of the one or more inflatable shapes, the lightweight fabric placed around their outside surface, if any, and/or on the surface of other components, to assist in locating such components in three-dimensional space geometry.

In some embodiments, individual robots or robot swarms may utilize such drawings, visual fiducial markers, and optional unique numbers to ensure that the right component part is assembled in the correct position and with the correct 3-dimensional orientation for the finished exoskeleton and skin placement to be in accordance with the intended design therefor.

In some embodiments, additive construction technology, 3D printing, stereolithography processes, and the like may be used to provide portions of the exoskeleton and/or skin. In such embodiments, one or multiple robots may be used to "print" these components. Optionally, in such cases, a second robot or robot swarm later smooths the surface of the object or surface.

In some embodiments, once the exoskeleton is completed, an endcap may be coupled with the exoskeleton and the axle of a turning device may be attached thereto. Once attached, in one preferred embodiment, the amount of lifting gas may then be adjusted to reduce the net weight of the airship body, whereupon in one embodiment the body may be turned by said axle to assist in inspections, applying a smooth skin surface, and other desired production steps.

And in some embodiments, selected ones of the inflatable shapes may used to cause the front of the airship to be lowered and the rear of the airship to be elevated to assist in coupling the endcap or the front compartment; and selected ones of the inflatable shapes may be used to cause the rear of the airship to be lowered and the front elevated to assist in coupling the endcap or the aft engine.

In one illustrative embodiment multiple robots—homogeneous or heterogeneous—are interconnected, forming a swarm of robots. Since individual robots have processing, communication, and sensing capabilities locally on-board, they are able to interact with each other and react to the environment autonomously.

BRIEF DESCRIPTION OF THE DRAWINGS

FIG. 1, including sub-parts 1(a) through 1(c), depicts in subpart 1(a) the exoskeleton structure for a lighter-than-air airship to be constructed by application of the principles of this disclosure.

FIG. 2 is a table listing the base robotic capabilities and base automated operations employed by one or more robots in carrying out the system and method in accordance with the principles of this disclosure.

FIG. 3, including sub-parts 3(a) through 3(c), depicts aspects of assembling such exoskeleton using the bottom-up construction alternative; and in subpart 3(a) depicts the partially completed exoskeleton with a horizontal cable temporarily attached to a segment of the structure being assembled by one or more robots.

FIG. 4, including sub-parts 4(a) through 4(c), depicts in subpart 4(a) use of inflatable gas bags to hold three-dimensional space until the full exoskeleton circumference is completed, and in an optional embodiment to assure that the net weight of the partially completed airship is continuously maintained within a pre-determined acceptable weight range.

While implementations are described herein by way of example, those skilled in the art will recognize that the implementations are not limited to the examples or drawings described. The drawings and detailed description thereto are not intended to limit implementations to the form disclosed but, on the contrary, the intention is to cover all modifications, equivalents and alternatives falling within the spirit and scope as defined by the appended claims. As used throughout this application, the word "may" is used in a permissive sense (i.e., meaning having the potential to) rather than the mandatory sense (i.e., meaning must). Similarly, the words "include," "including," and "includes" mean including, but not limited to. Additionally, as used herein, the verbs "connect", "couple" and "attach", and the corresponding descriptive terms "connected", "coupled" or "attached", respectively may refer to the act of connecting two or more components together, or the attribute of such components being connected together, whether that connection is permanent (e.g., welded, glued, bonded, or brazed) or temporary (e.g., bolted, held by a pin, held in place by friction or tension, or through joints or pairing), direct or indirect (i.e., through an intermediary), mechanical, chemical, optical or electrical.

DETAILED DESCRIPTION OF THE DRAWINGS

The subject technology describes improvements over the prior art for assembling airships and other large structures, particularly in aviation and aerospace. In an illustrative embodiment, these improvements are achieved through using specially programmed, autonomous, semi-autonomous and/or human-directed robots to assemble the structural frame, attach, lay-up, or print the skin, and perform other tasks in manufacturing an airship and constructing other structures that are otherwise challenging, inefficient, or unsuitable for humans to perform, and/or that would otherwise require significant investments and long-lead times to build highly capital intensive manufacturing facilities.

These and other aspects of the subject technology are disclosed through use of the following illustrative figures.

Figures 1A, 1B, 1C:
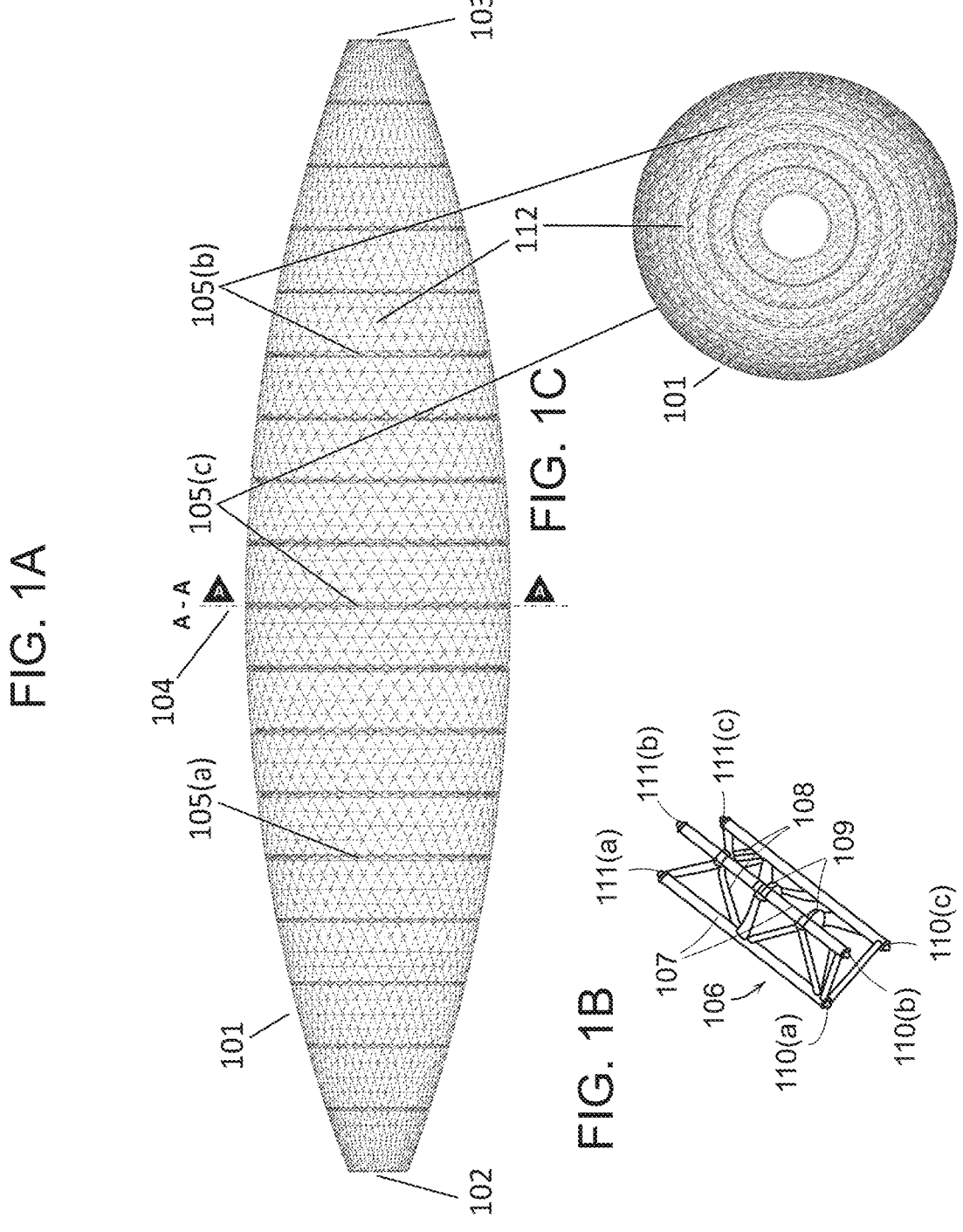
FIG. 1(b) illustrates a standard truss module that when connected with adjacent truss modules may be used to construct circular structural frames as part of such exoskeleton structure.
FIG. 1(c) provides a schematic illustration of a section view of such exoskeleton at the midpoint between the front and the rear end of such structure.

FIG. 1, comprised of FIGS. 1(a) through 1(c), illustrates exoskeleton 101 in one embodiment of an airship. As shown, FIG. 1 generally corresponds to the exoskeleton in one preferred embodiment of the airship disclosed in Applicant's prior '145 patent and as more particularly described with respect to FIG. 5 thereof. Exoskeleton 101 is herein presented as a non-limiting illustration of the frame of any airship and other large structure whose size and/or weight tends to cause construction using traditional systems and methods to be difficult, inefficient, or ill-suited for humans to perform, and/or that otherwise requires significant investments to be made in very capital-intensive manufacturing facilities and equipment.

FIG. 1(a) shows the full length of airship structure 101, including front end 102 and rear end 103, and indicates said airship's approximate midline 104, and the presence of one or more circular structural frames 105 that optionally may be used to provide added rigidity to such structure. By way of non-limiting example, a total of 18 circular frames are depicted in the schematic illustration shown in FIG. 1(a), including circular frame 105(a) in the front quarter of the airship; 105(b) in the rear quarter of the airship; and 105(c), at the midpoint between the front 102 and rear 103 of the airship structure.

Each such circular frame 105 employs a truss comprised of multiple truss modules 106 that together make up its full circumference. FIG. 1(b) shows an illustrative example of one such truss module 106 that is built with an open, skeletal assembly of longitudinal members 107, struts 108, and joints 109 to achieve a support structure of high load-bearing capacity relative to its weight. Each truss module 106 includes coupling joints 110(a), 110(b) and 110(c) that connect with corresponding coupling joints 111(a), 111(b) and 111(c) of the next adjacent truss module. Structural frames 105 are illustrated as being based on the geometric triangle to take advantage of its inherent rigidity in supporting a coplanar load. Notwithstanding, this shape, as well as the number of such structural frames 105, the number of modules 106 comprising each such circular frame, and the respective dimensions, weights, construction materials, and methods used to connect the individual components comprising such modules, are non-limiting, used for illustrative purposes only, and may differ without departing from the principles of this disclosure.

Also for the purposes of illustration and not limitation, the diameter of airship structure 101 at midline 104 is assumed to be 200 feet, and the length of the airship is assumed to be 1,000 feet. Such dimensions require an assembly facility whose width and ceiling height is a minimum of 225 feet—roughly equal to the height of a 20-story building; and a minimum length of 1,100 feet—approximately the length of three football fields placed end to end. Using traditional construction techniques, this roughly 250,000 square foot, twenty-story tall structure, and would require one or more massive overhead cranes with a free span of at least 200 feet that can lift the full exoskeleton or major portions thereof. In the illustrative case, an airship this size is estimated to weigh more than 100 tons, including its structure and skin, and over 200 tons once the cockpit, engines, tail, and internal mechanical, electrical, propulsion, thermal management, and storage systems are included.

FIG. 1(c) provides a cross-sectional view of Section A-A from FIG. 1(a). As shown, FIGS. 1(a) and 1(c) include structural members 112, which optionally may reflect different intensity levels of framing in accordance with the selected design of the project sponsor. For the purposes of illustration only, the structural elements shown in FIG. 1 generally correspond to the triangular pattern disclosed with respect to the exoskeleton in one preferred embodiment of the airship in Applicant's prior '145 patent. As more particularly described therein, there are 48 triangles on each side of midline 104 comprising the circumference of the structure. The number of triangles may remain the same, but the length of each structural member will become progressively shorter, and the angle of placement will change as the diameter of exoskeleton 101 becomes narrower. Although as described in greater detail within the '145 patent, the number of triangles may drop as construction moves in the direction of the front 102 or rear 103, exoskeleton 101 assumes that the number of triangles will remain the same even as the diameter of the exoskeleton becomes narrower. It will be apparent to those of ordinary skill in the art that the length, placement, and orientation of such assembly requires precise placement within three-dimensional space and appropriate inspection and controls to assure that the proper parts are used in the proper locations.

One or more autonomous, semi-autonomous, and/or human-directed robots, acting independently and in robot swarms, are used as hereinafter described to address these challenges and overcome other limitations of the prior art. In this regard, the '856 patent describes a system and method utilizing computer-integrated manufacturing (CIM), a manufacturing approach of using computers to control the entire production process. As disclosed therein, which disclosure is incorporated herein in full by this reference, CIM enables flexible product manufacturing using a software-defined product design flow in which core robotic capabilities and automated operations are selected, sequenced, verified, tested, and planned; and in which immediate feedback is provided to designers so they can know if their designs are suitable for production and/or the robots require additional capabilities to be added to the sequence to manufacture such designs. This approach of using computers to control the entire production process, is used in the system and method of the '856 patent to control individual processes and enable processing robots to exchange information with each other, and with design personnel, and to initiate actions that can change the way products are produced. This in turn reduces manufacturing time and results in less errors. The system and method of the '856 patent also describes utilizing software and computerized systems to assist in configuring the manufacture of various process steps, which in turn shortens the time required for factory readiness for product production, improves process efficiency, lowers production costs, and improves factory efficiency.

Turning to FIG. 2, table 201 provides a non-limiting list of the base robotic capabilities 202 and base automated operations 203 that, in one preferred embodiment, are employed by the one or more robots in carrying out the disclosed system and method. Base robotic capabilities 202 are the functional elements that can be part of many different tasks; and base automated operations 203 are the core tasks that the robots are designed and programmed to perform through employing these basic capabilities. It will be understood by persons of ordinary skill in the art of robotics that such core tasks may be performed using different tooling or end effectors to carry out assigned tasks. For example, the simplest robots consist of an arm with a tool attached for performing a particular task; and a different end effector may be attached that enables the same robot to perform another task. Similarly, persons of ordinary skill will understand that the robotic actions may differ depending on the manufacturing requirements for a particular structure, and further that additional base robotic capabilities 202 and base automated operations 203 may be added in combination with alternative tooling and software programming to carry out the spirit and scope of the disclosure To function, a robot must have power; and as shown, the base robotic capabilities 202 that are necessary for manufacturing various components, assembling the frame, attaching skin to airship structure 101, and performing other manufacturing tasks, include power supply 204. In a preferred embodiment the robots used get their energy from electricity. While stationary robots may be used for extrusion and fabrication of parts to be employed in the assembly of airship structure 101, and can be plugged in, a significant number of the robots employed will be required to move around. Such robots require battery power, and in one preferred embodiment utilize hydrogen fuel cell based electric power to benefit from longer operating duration and greater torque strength deriving therefrom.

A second vital capability is the robot's control system 205, which consists of a central processing unit, or CPU, that can be programmed to perform automated tasks, or to interpret and respond to signals from sensors 206 to adjust its actions accordingly. In one illustrative environment, control system 205 includes both remote processing and centralized processing that will enable the robots to function autonomously, when required, as well as in coordinated actions with other robots or in response to commands provided by human operators, controlling one or more robot actions remotely. In one preferred embodiment, sensors 206 are smart sensors, which collect a specific type of data from a physical environment (outside or inside) and use computing resources that are built into the sensor to perform a predefined and programmed function on the data it is collecting and then pass that data on via a networked connection. These include, but are not limited to precise locational sensors, level sensors, pressure sensors, weight sensors, temperature sensors, proximity sensors, heat and flow sensors, fluid velocity sensors, and electric current sensors. Sensors 206 monitor different processes, collecting data, taking measurements, and in a preferred embodiment sending this data using the industrial Internet of Things (IIoT) and cloud computing platform to monitor and record data from, and in turn to direct and control, the entire manufacturing process.

Another base robotic capability is movement 207, which encompasses the full range of mobility and action, depending on the requirements of the task to be performed. For example, many of the robots used in the disclosed system and method may be equipped with wheels, threads or mechanism for base automated operations such as rolling 216 on flat surfaces, irregular surfaces, or along guides or cables, or employ arms that mimic human movement for climbing 217. Other movements required in manufacturing the airship including gripping 218, reaching 219, and braking 220, as more particularly described with respect to FIG. 3 and FIG. 4, and gripping 218, lifting 226, holding in place 227, connecting 227, and inspecting 233 with respect to FIG. 6, in each case using actuators that are well known to persons of ordinary skill in the art of robotics. To effectively perform these movements, another base robotic capability in one preferred embodiment is locational awareness 208, which may incorporate data from sensors 206 that detect the robot's current physical location with respect to specified three-dimensional spatial coordinates, a particular work area or application, or in relation to one or more other robots; and then can manipulate this data to control actions, information, and the robot's movement.

Locational awareness 208 may also be based on machine vision 209, which is yet another base robotic capability in one preferred embodiment. Machine vision 209 employs one or more video cameras and/or digital sensors inside one or more industrial cameras with specialized optics to perform a variety of functions in addition to optionally assisting with locational awareness 208. In carrying out the system and method, this includes identifying 221, for example, specific parts, including but not limited to by reading a unique identification code printed or otherwise displayed on such part and picking 222, for example, the correct part for carrying out the desired task. Another application of machine vision 209 may be to read AprilTags, other visual fiducial markers, and laser pointers to assure the appropriate placement and orientation of components.

Another base robotic capability is articulated arm 210, which assists in carrying out numerous tasks including but not limited to climbing 217, reaching 219, picking 222, handing 223, placing 224, inserting 225, lifting 226, connecting 229, and attaching 230, as more particularly described with respect to FIGS. 3, 4, and 6, below. Yet another base robotic capability is communication 211. It is generally understood that distributed intelligence in robotics and autonomous systems applications relies heavily on seamless wireless connectivity. In particular, the IIoT/cloud-based robotics paradigm requires such communication technologies for offloading high complexity computational tasks to the edge/cloud platform. Accordingly, such communication 211 capabilities connect in a preferred embodiment with the central controller system, other robots and, in cases where oversight or remote control by a human operator is necessary or desired, with such individuals.

In one optional embodiment, base robotic capabilities 202 also includes 3D printing 212, which is an additive process wherein layers of material are built up to create a 3D part or printed surface area, which optionally may be employed in conjunction with articulated arm 210. One non-limiting example of where this may be employed is to print the skin or certain portions of the external structure 101, and thereby to achieve functional capabilities that are otherwise difficult or impossible without employing additive manufacturing technology. Such 3D printing 212 may use several different materials, including without limitation, plastics, composites, or metals, to create objects that range in shape, size, rigidity, density, and color. 3D printing 212 may also be used to produce parts like grippers, sensor mounts, end-of-arm tooling, and various replacement parts for other robots employed in the system and method.

Changing such end effectors, tooling, robot peripherals, and robot accessories is important to the smooth operations of the system and method. Accordingly, another base robotic capability in an optional preferred embodiment is end of arm tooling 213, or automatic tool changing, which provides an automated process to change tools and pass various utilities without human intervention. Such end of arm tooling 213, in combination with other base robotic capabilities 202, will enable one or more robots, in a preferred embodiment, to perform tasks including gripping 218, cutting 228, connecting 229, attaching 230, smoothing 231, and cementing 232, the utility of which, to persons of ordinary skill in the art, will be readily apparent in carrying out the tasks described with respect to FIGS. 3, 4, and 6, below.

Assembly techniques 214 refers to a library of standardized assembly routines or scripts that employ various base automated operations 203 to be performed by one or multiple robots, alone or in swarms. In one preferred embodiment, such assembly techniques 214 are software-based instructions; and in another optional embodiment, these instructions are burned directly onto specialized ROM-based chips used by one or more robots. Such assembly techniques 214 preferably include all aspects of the manufacturing process, including in one optional embodiment, instructions for buildout of the underlying production process equipment itself within a building shell. In one preferred embodiment, such assembly techniques 214 include instructions for the individual process steps necessary to produce custom fabricated or extruded components and parts, select and assemble these components to produce airship frame 101, and to apply the skin thereto. In another one optional embodiment, such scripts are used for adding electrical and mechanical systems, attaching 230 and connecting 229 third-party produced equipment and vessels, and other related tasks.

Machine learning/AI 215 is another base robotic capability in a preferred embodiment. Persons of ordinary skill in the art will understand this involves computer systems that are able to learn and adapt without following explicit instructions. This is accomplished by using algorithms and statistical models to analyze and draw inferences from patterns in data. Incorporating these capabilities will, in one preferred embodiment, enable the robots used to become more proficient in carrying out the system and method without being explicitly programmed to do so. This is achieved by using historical data as input to predict new output values. In an optional preferred embodiment, such processing crosses from machine learning to AI (artificial intelligence), which as used herein, indicates that the robots are able to execute tasks "smartly", such as by acting in a coordinated manner with other robots to complete a task in an optimal manner, or by allowing humans to communicate with such robots using normal, everyday language to perform tasks.

The final two base automated operations 203, inspecting 233 and photographing 234, employ a combination of multiple base robotic capabilities 202, including control system 205, movement 207, machine vision 209, articulated arm 210, and communication 211 to provide, in one preferred embodiment, documentation and assurance that the frame assembly and skin surface meet the stringent requirements of aeronautical certification and performance even though most of the surfaces being inspected or photographed are well out of the reach of direct human inspection.

As noted above, additional base robotic capabilities 202 and/or base automated operations 203 may be necessary or desirable to fulfill the manufacturing requirements of a particular oversized or exceedingly heavy structure. Buttons 235(*a*) and 235(*b*) respectively indicate that in a preferred embodiment, there is an ability to add such additional capabilities and operating functions where useful to overcoming design, manufacturing, assembly, or inspection challenges; resolving production inefficiencies; reducing costs or production time; performing tasks that are unsuitable or unsafe for humans to perform; or increasing quality, reproducibility, and scalability.

Turning next to FIG. 3 and FIG. 4, a series of illustrations and corresponding disclosures are provided with respect to using these robotic capabilities to assemble an airship in a bottom-up embodiment. Following this, in FIG. 5 and FIG. 6, a series of illustrations and associated disclosures are provided with respect to an alternative approach in which such airship assembly proceeds in accordance with a top-down alternative embodiment. Persons of ordinary skill in the art will readily appreciate that a hybrid approach incorporating aspects of both the bottom-up and top-down assembly alternatives may also be useful and in many instances represents a preferred embodiment for practicing the disclosure.

FIG. 3(*a*) depicts the partially assembled lower portion of exoskeleton 101 seated on sled 301 that in one embodiment may be coupled to the structure in four locations where structure 101 is reinforced for attachment of the interior loading bay area when the airship is complete. Sled 301 is preferably made from reinforced carbon fiber members that are hollow such that they are simultaneously light in weight, very strong, and non-corrosive; and is seated in landing base 302 that is specially designed to couple to sled 301 for conveniently servicing the airship when docked, including in one optional embodiment adding or removing hydrogen to or from said airship; and in another optional embodiment, filling the hollow portion of sled 301 with water as temporary ballast when unloading cargo and then vacating that water when the airship is about to depart. Landing base 302 is in turn permanently built on a reinforced foundation 303. In one optional preferred embodiment, when the airship is completed, it may be flown to its remote intended base of operations with sled 301 attached, and where another landing base 302 has been built for it.

FIG. 3(*a*) also shows cable 304, which is suspended horizontally between posts 305(*a*) and 305(*b*). In turn, FIG.

Figures 3A, 3B, 3C:
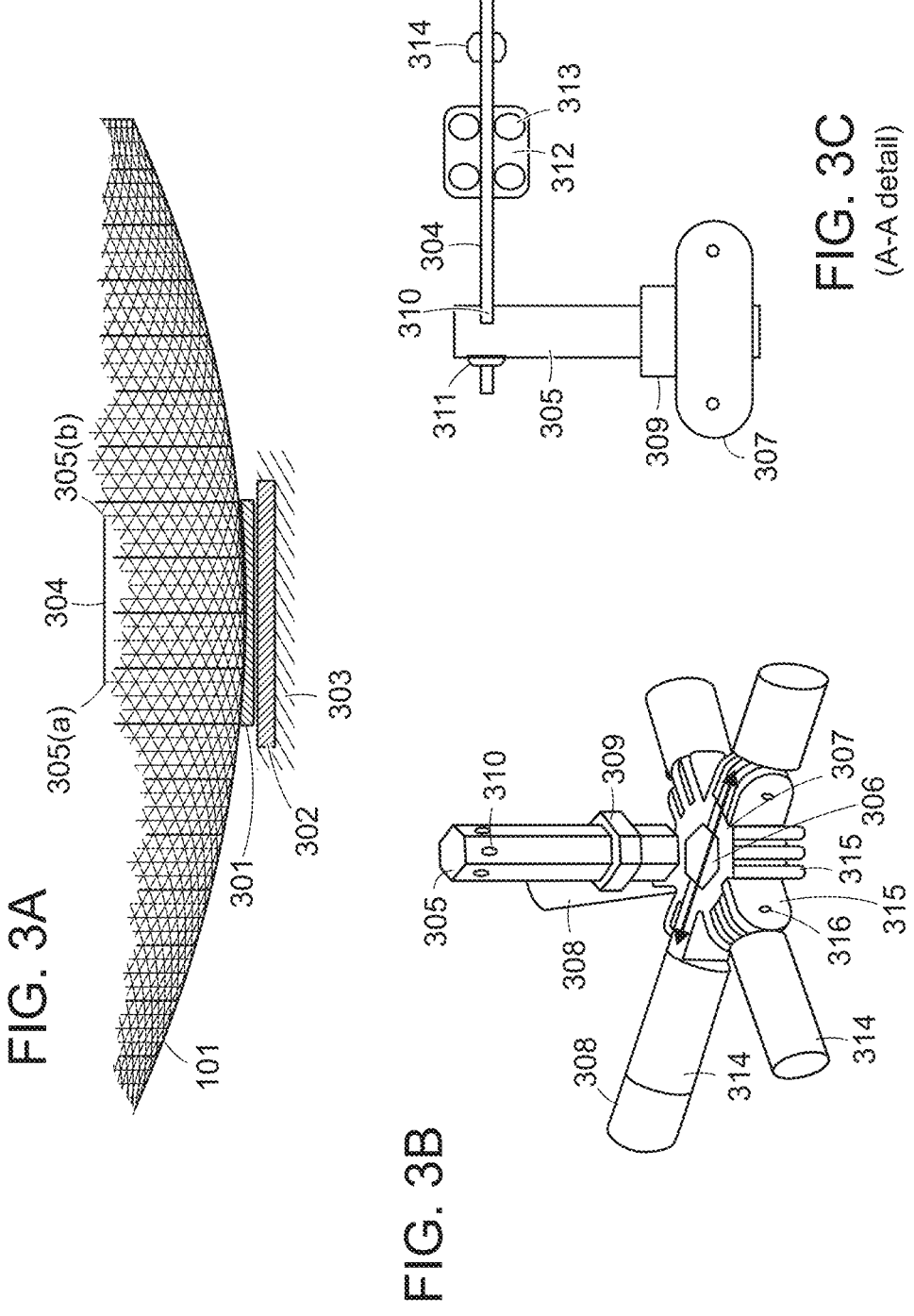
FIG. 3(b) provides an example of how the post to which such horizontal cable is attached may in turn be anchored in a hub of the exoskeleton; and subpart 3(c) illustrates connecting the cable to a post, and in turn providing a guide rail for one or more of said robots to utilize.

3(b) illustrates how a post 305 may be securely coupled with a hub 307 of exoskeleton 101. Hub 307, spokes 308, which attach thereto, and other components thereof are discussed in detail in the specification of Applicant's prior 145 patent, and in particular the detailed description associated with FIG. 4 thereof. As shown in FIG. 3(b), opening 306 provides a socket opening for securely anchoring post 305. Collar 309 serves to restrict post 305 from being pushed all the way through opening 306 and in one preferred embodiment, the complementary shapes of post 305 and opening 306 permit a secure coupling that will not allow post 305 to turn once embedded in opening 306. Once in place, post 305 may be used either as a base for a robot, and/or cable 304 may be threaded through eyelets 310 to assist in their movement.

In this regard, FIG. 3(c) provides a cross-sectional view of Section A-A of FIG. 3(b). As shown therein, cable 304 has been threaded through eyelets 310, and clamp 311 has been applied to assure that cable 304 will not slip out. Once such cable 304 is secured at the other end, robot base 312 and wheels 313 can attach thereto, in this way enabling a climbing robot to move across large spans of open area during construction of exoskeleton 101 and to assist in attaching skin to said exoskeleton. Once the specific manufacturing process is complete, post 305 can be removed from opening 306 and used elsewhere until construction is completed. Clamp 312 illustrates the use of one or more additional clamps to optionally restrict the movement of said robot's range of movement along horizontal cable 304, or to connect a horizontal cable 304 to a vertical cable 403, as more particularly described below.

Through multi-arm robots, including but not limited to spider-bots, employing the base robotic capabilities 202 to perform base automated operations 203 in conjunction with the components described within FIG. 3, it will be apparent to persons of ordinary skill in the art how individual robots, or groups of robots working in a coordinated manner, can work at heights of 50 feet or greater, thereby enabling workers to avoid dangerous conditions when performing assembly and other manufacturing operations involving an airship or other large and/or heavy structures.

In one embodiment, portions of the exoskeleton may be constructed laying on its side until the full circumference is completed, whereupon the section is then raised to an upright position so that it can be connected to other partially completed sections to create a stable base for attaching guide rails and cables in the manner described. In another, embodiment, airship structure 101 can be assembled in a linear fashion, with one or more robots attaching 230 themselves to posts 305 in the manner described above to derive support from the one or more rows of assembled hubs 307 and spokes 308 that have already been completed. In an optional alternative embodiment, robots insert one or multiple posts 305 in space 306 of hubs 307 on either side of an open area generally as illustrated by posts 305(a) and 305(b), install cable 304 between them, and then move using wheels 313 along cable 304 to build out the open area in between.

In yet another embodiment, cable 304 may be connected at one or both ends to one or multiple secure points that are separate from the airship's own structure 101, for example that are attached to the building or the shop floor in which such assembly is taking place. In this case, materials handling robots may move along these cables, with such fetching robots identifying 221 the appropriate parts needed at the intended location of assembly on said exoskeleton 101, and then picking 222, gripping 218, and bringing (e.g., handling 223) these parts to other robots at or near the intended assembly location. Upon receiving such parts from these fetch robots, assembly robots may connect these parts with others in accordance with assembly techniques 214 that correspond to the design of the frame. By way of a non-limiting example, such assembly technique 214 for the hub and spoke structure described in Applicant's prior '145 patent would entail inserting 225 the two-pronged protrusion at one end of each insert 314 into one of the six, three-pronged sockets 315 to create a hinged connection on the desired side of hub 307 for addition of the next spoke 308. That robot, or another one working in communication 211 with it, would then be able to couple spoke 308 with the corresponding insert 314, and using location awareness 208 to cause these structural members to be properly aligned and seated when the structure assembly is completed. One of these robots (or a third one working in communication 211 with them) may then secure the connection by inserting 225 pins 316.

Figures 4A, 4B, 4C, 4D:
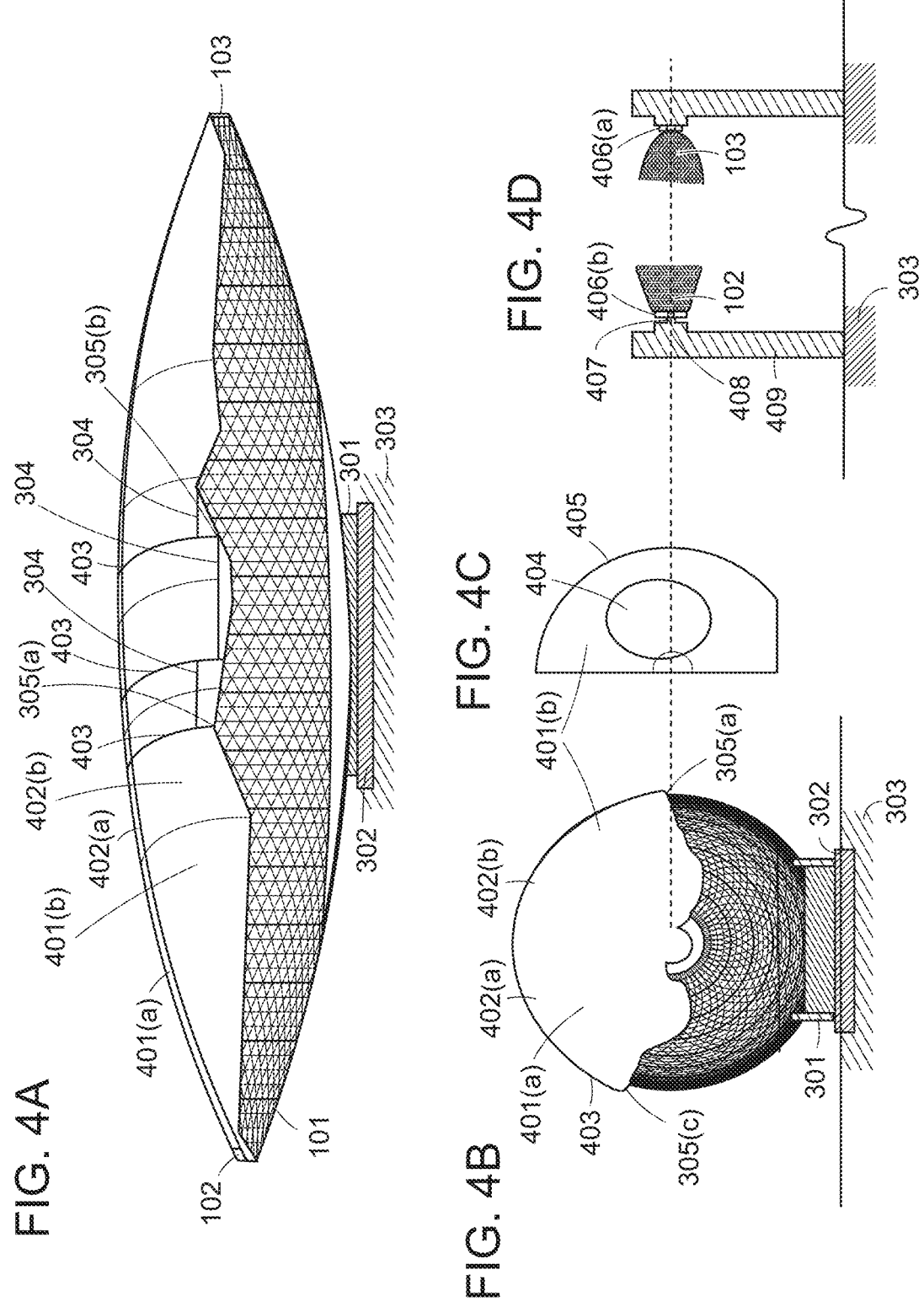
FIG. 4(b) shows a section view of a partially completed exoskeleton structure, inflatable gas bags, and use of a guide wire that may be strung over said three-dimensional space to enable placement of horizontal and vertical guide cables for movement of said robots.
FIG. 4(c) illustrates a single representative gas bag and shows contained therein an optional ballonet for adjusting the buoyancy of the gas bag, as well as the optional use of a woven fabric to reduce the risk of abrasion and/or damage to the gas bags.
FIG. 4(d) illustrates coupling an endcap to each end of the exoskeleton and in turn connecting each endcap to the axle of a turning device in one optional embodiment.

FIG. 4, consisting of four sub-parts, illustrates other aspects of the bottom-up alternative embodiment. FIG. 4(a) illustrates the use of one or more inflatable shapes such as gas bags or cells inside the partially completed exoskeleton 101 of FIG. 3(a). As illustrated, in one non-limiting example, twelve (total) such gas cells are provided, six on each side of the midline running lengthwise from the front 102 to the rear 103 of said exoskeleton 101. In one preferred embodiment, the volume of all such gas cells is equal, which will result in the shapes having different lengths and profiles as the diameter of the airship hull shape changes. Thus, as illustrated, gas cells 401(a), located on the left side of this midline, and 401(b) on the right side thereof, have matching shapes that taper down with the final shape of the [future] hull and are quite long; whereas gas cells 402(a) and 402(b) on either side of said midline directly behind cells 401(a) and 401(b), contain the same volume of gas, but are much shorter in length. Other shapes and configurations of these gas cells may be employed while adhering to the principles of this disclosure.

In one optional embodiment, such gas cells may contain ambient air and function as temporary shapes around which exoskeleton structure 101 may be constructed. In such optional embodiment, the primary function of such gas cells is to occupy three-dimensional space in the shape of the future airship hull, provide resistance that will assist in stability of the partially complete exoskeleton 101, and help prevent the structure from "falling in on itself" prior to when the stability of the full circumference will enable said exoskeleton 101 to maintain its own form. Once inflated, these gas cells will enable vertical cables 403 to be drawn over the outside surface of such inflatable shapes and connected to posts 305 inserted in hubs 307 located on either side thereof. As shown, vertical cables are attached to posts 305(a) and 305(b) in the manner previously disclosed and clamps 314, illustrated in FIG. 3(c), enable horizontal cables 304 to be attached to such vertical cables 403, thereby increasing the areas that can be reached by assembly robots.

FIG. 4(b) shows a section view of the front end of the partially completed exoskeleton structure 101 with inflatable gas cells 401(a) and 401(b) located inside, and immediately behind them gas cells 402(a) and 402(b). The figure also shows post 305(a) which is used to anchor vertical cable 403 on the right side of the partially completed exoskeleton 101, strung over the top of inflatable gas cells 402(a) and 402(b), and then connecting to post 305(c) on the left side of said exoskeleton frame 101. This will minimize the need for overhead cranes or construction of intermediate crosswalks to hold the partially built exoskeleton until the full circumference of exoskeleton 101 can be completed, thereby enabling the structure to distribute the weight of the airship along the full circumference thereof.

Turning to FIG. 4(c), an illustration is provided of gas cell 401(b), as representative of all the gas cells. As shown therein, in one alternate embodiment, the inflatable shapes may be filled with a lifting gas such as helium or hydrogen, and optionally may include a second, inner gas cell 404 that is filled with air. Persons of ordinary skill in the art of lighter-than-air design will recognize the similarity of inner gas cell 404 to a so called "ballonet", which is generally understood to be an air bag that is located on the inside of the outer envelope containing the lifting gas such that, when the ballonet is inflated, the volume available for the lifting gas is reduced, thereby increasing its density, reducing the overall lift and in turn causing the descent of the airship, while deflating the ballonet increases lift. Whereas ballonets are typically used for buoyancy control in non-rigid or semi-rigid airships—and in fact may, or may not, have any utility to operation of the airship being constructed depending on the design intentions of its sponsor—the use of an inner gas cell 404 within each inflatable shape may be useful in the manufacturing of such airship.

In yet another alternate embodiment, gas cell 401(b) and the remaining gas cells may be filled with air, and inner gas cells 404 may be filled with the desired lifting gas (e.g., helium or hydrogen). This alternative embodiment has the advantage of being closer to the configuration of gas bags used in rigid airships, wherein the lifting gas cells are flexible envelopes protected within the airship hull. In such case, each lifting gas cell has an access point for filling (e.g., adding the lifting gas) and venting it if necessary; and around the gas cells is an envelope of air that serves as a safety feature. To the extent that hydrogen is used as the lifting gas, as hydrogen molecules slowly migrate through the wall of the gas cells, this leakage needs to be dissipated prior to reaching a flammable concentration. Since hydrogen rises rapidly the airship is constructed with a slow, but steady flow of air along the top of the gas cells, along with monitors to measure the hydrogen concentration, and the ability to increase the ventilation if needed.

In another embodiment, an outer layer of lightweight fabric 405 such as aramid fiber or Kevlar® is produced in the desired form of the inflated shapes and placed around their outside surface to reduce the risk of abrasion should they inadvertently come into contact with the exoskeleton as well as to reduce the risk of such shapes being damaged during construction. In one preferred embodiment, "sleeves" may be designed in the lightweight fabric through which spokes 308 can be threaded during assembly of the exoskeleton. Doing this will assure that said shapes adhere to the desired portion of the exoskeleton structure 101. In some optional embodiments, the inflatable shapes and this fabric may be removed upon completion of construction, and in other preferred embodiments, the one or more inflatable shapes and this fabric will remain permanently inside the exoskeleton for the lifetime of the airship, and be used in its operation following completion of construction. In a preferred embodiment, helium may be used as the lifting gas during construction and hydrogen may be used once the airship is complete and placed into operation.

And in some embodiments, the placement of hubs, spokes and other key components may be drawn directly using human and/or machine-readable text or tags onto the surface of the one or more inflatable shapes, or the lightweight fabric 405 to assist the robots in identifying 221 and placing 224 such components in three-dimensional space. In other optional embodiments, the robots or robot "swarm" may utilize such drawings and optional unique numbers and tags to ensure that the right component part is assembled in the correct position for the finished exoskeleton and skin placement to be in accordance with the intended design therefor.

Using one of the foregoing gas cell alternatives, in one embodiment the buoyancy of such inflatable shapes may be adjusted to maintain a neutral or desired level of negative buoyancy of the airship or selected portion thereof. This will ensure that the weight of such airship or portion thereof always remains in a predetermined acceptable range as construction proceeds, and will minimize the need for cranes, mechanical and/or hydraulic jacks, and other lifting equipment. In one preferred embodiment, an automated control system may be programmed to control the relative quantities of lifting gas and air that is contained in the one or more inflatable shapes, the objective of such control system programming being to continuously monitor the net weight of the partially completed airship and to maintain the desired buoyancy characteristics by adjusting the quantities of air and lifting gas as construction progresses so as to maintain both the integrity of said one or more inflatable shapes as well as the overall neutral or desired net negative buoyancy level at all times.

In one embodiment, the effective net weight of the airship (e.g., the total weight of the parts of the ship that has been completed less the effect of the lifting capacity of the lifting gas-filled inflatable shapes) is maintained in the range of between 10,000 to 20,000 pounds. This range (e.g., 5 to 10 tons) may be changed in accordance with the wishes of the manufacturer and illustrates the principle of this aspect of the disclosure that notwithstanding that the actual combined weight of the airship may eventually reach in excess of 250,000 pounds, the effective weight can, be kept much more manageable by practicing the disclosed principles.

In one embodiment, prefabricated curvilinear parts comprising portions of the skin are attached 230 to the exoskeleton through robots carrying out their assembly techniques 214. In another, the skin is applied, laid-up, or cemented 232, smoothed 231 and inspected 233 to assure it does not have wrinkles, bubbles, dimples or other unacceptable imperfections. In an optional embodiment, additive construction technology 212 may be used to provide portions of the exoskeleton and/or skin. In such embodiment, one or multiple robots mount onto posts 305, horizontal cable 304 and/or vertical cable 403 and, using one or more computer-controlled articulating arm(s) 210, lay-up or 3D print 212 these components. Optionally, in such cases, a second robot or robot swarm later smooths 231 the surface in order to minimize skin friction and drag during flight.

FIG. 4(d) illustrates another one alternative embodiment. In some embodiments, once the exoskeleton 101 is completed, a temporary endcap 406(a) is coupled with the front 102 of said exoskeleton 101, and temporary endcap 406(b) is coupled with the rear 103 thereof. The axle 407 of a turning device 408 may be temporarily coupled thereto. Getting the completed airship on this device his process may be assisted by adjusting the height of the turning device on its mounting 409 and simultaneously reducing the effective net weight of the airship using the previously described automated control system to increase the relative quantity of lifting gas and reducing the volume of air that is contained in the one or more inflatable shapes. Once coupled to such turning machine 408, in one preferred embodiment, the amount of lifting gas may then be adjusted to further reduce the effective net weight of the airship to approximate neutral buoyancy, whereupon in one embodiment the full airship body may be turned by said turning device 408 to assist in inspections, laying-up a smooth skin surface, and other desired production steps.

And in other optional embodiments, selected ones of the inflatable shapes may used to cause the front of the airship 102 to be lowered and the rear of the airship 103 to be elevated to assist in coupling endcap 406(*a*) or the front compartment that attaches to said exoskeleton. In another optional embodiment, selected ones of the inflatable shapes may be used to cause the rear of the airship 103 to be lowered, and the front 102 elevated, to assist in coupling endcap 406(*b*) or mounting or working on the aft engine.

Figure 5A:
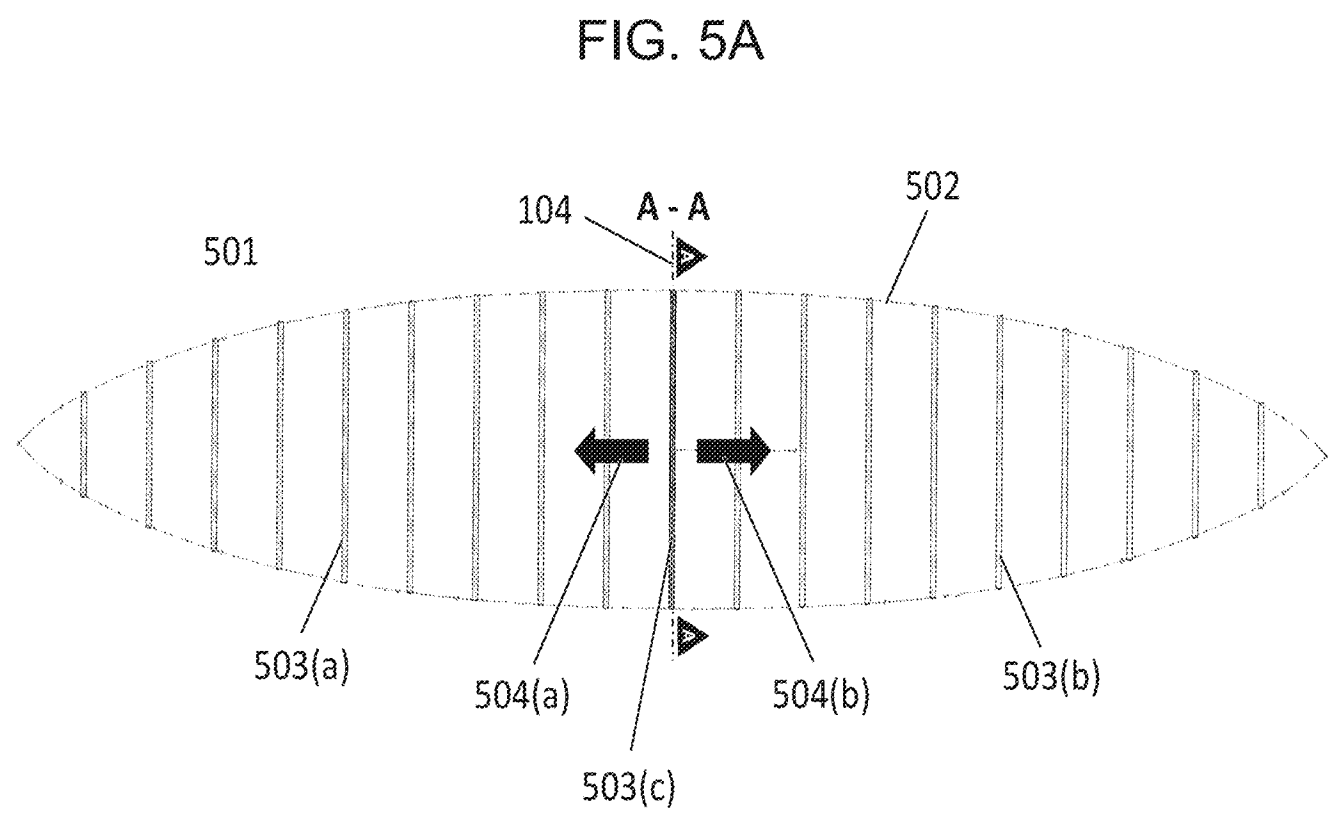
Figure 5B:
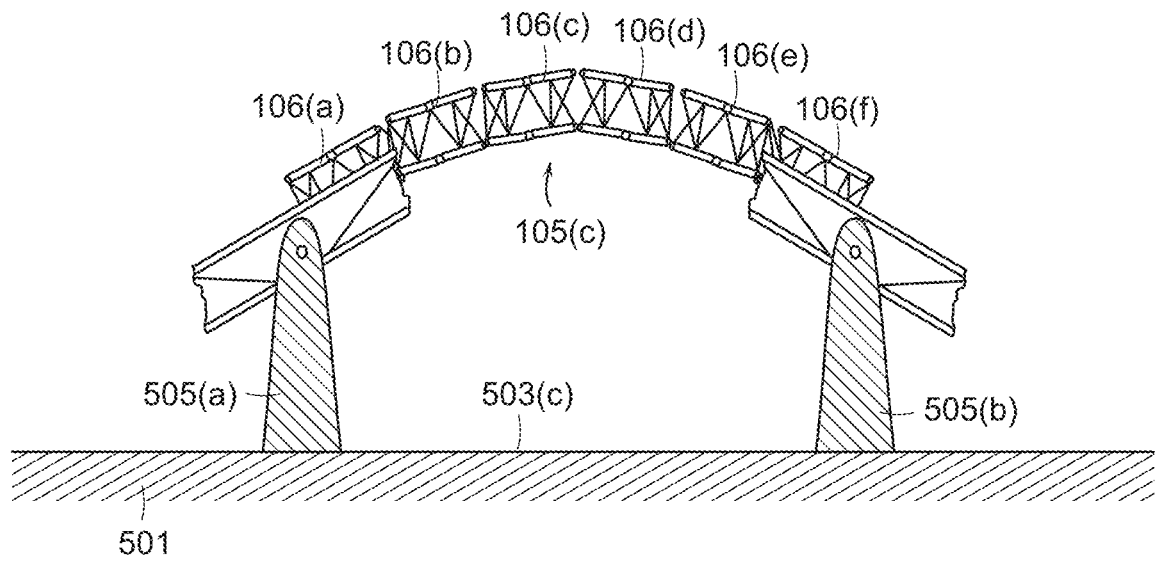
FIG. 5(b) schematically illustrates the use of such heavy lifter robots to hold a structural frame while construction takes place, and FIG. 5(c) provides a series of the same view over time to illustrate the progression of such robots lifting, as assembly progresses, the exoskeleton in accordance with the top-down construction alternative embodiment.
Figure 5C:
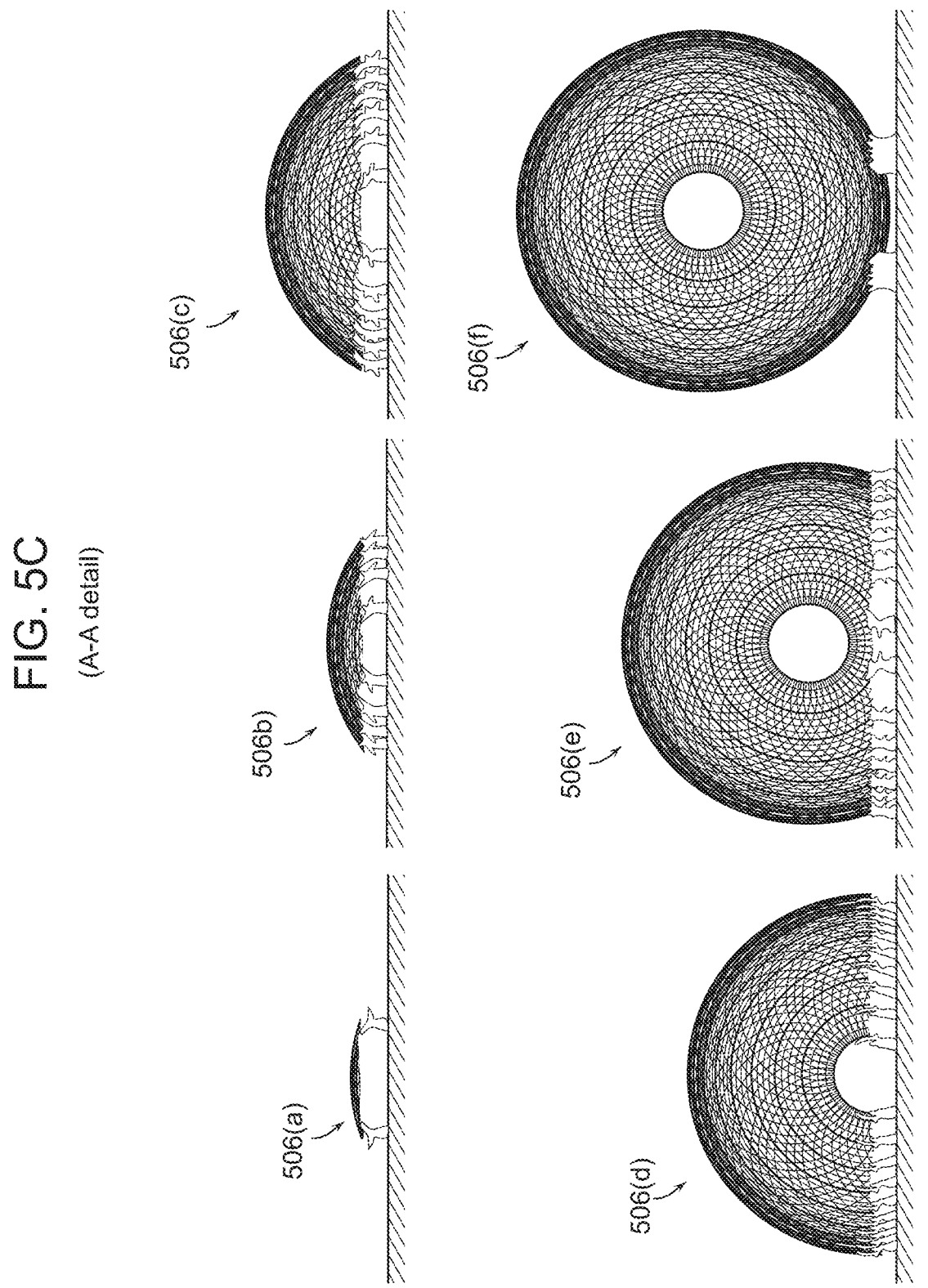
FIG. 5, including sub-parts 5(a) through 5(c), depict aspects of the top-down construction alternative.
FIG. 5(a) schematically illustrates a layout of floor rails or tracks for use by a class of heavy-lifter robots that are used in one embodiment to hold the partially completed exoskeleton an appropriate distance from the assembly facility floor and then to lift the partially completed structure as assembly of the airship frame progresses.

Turning next to FIG. 5, several illustrations are provided with respect to an alternative approach in which the airship assembly proceeds in accordance with the top-down alternative embodiment. FIG. 5(*a*) illustrates a view of the manufacturing facility floor 501 on which dashed line 502 represents an imaginary shape of the outer edge of the completed surface of airship 101 (referred to herein as its drip line). The vertical lines shown extending just beyond the edge of said drip line 502 illustrate epoxy or stud-mounted subplate tracks 503 that are attached to the facility floor, the placement of each such track corresponding to the location of a circular support frame 105 in airship 101. As illustrated, track 503(*a*) corresponds to the location of support frame 105(*a*) in the front quarter of airship 101 as one looks in the direction of arrow 504(*a*) pointing toward the front of the airship. Track 503(*b*) corresponds to the location of support frame 105(*b*) in the rear quarter of airship 101 as one looks in the direction of arrow 504(*b*) pointing toward the rear of the airship. Track 503(*c*) corresponds to the location of support frame 105(*c*) at the midline 104 of airship 101. Each of such tracks 503 provides a linear path for two or more so-called hand-over-hand (HOH) support robots 505, as more particularly described with respect to FIG. 5(*b*) and FIG. 6, below.

FIG. 5(*b*) illustrates the primary function of such HOH support robots in lifting 226 and holding in place 227 the partially completed airship 101, and thereby ideally enabling assembly and construction activity on the structure, outer surfaces, and interior components to be performed at or near the factory floor 502. The view shown in FIG. 5(*b*) is Section A-A along linear track 503(*c*) from FIG. 5(*a*) near the beginning of construction. HOH support robots 505(*a*) and 505(*b*) respectively hold 227 the left and right ends of the top portion of partially completed structural frame 105(*c*), which contains six truss modules 106(*a*) through 106(*f*). As more particularly described with respect to FIG. 6, below, HOH support robot 505(*a*) is gripping 218 truss modules 106(*a*) and 106(*b*), while HOH support robot 505(*b*) is gripping 218 truss modules 106(*e*) and 106(*f*). These truss modules are in turn connected to the apex of structural frame 105(*c*), which is comprised of truss modules 106(*c*) and 106(*d*).

FIG. 5(*c*) shown six arbitrary views of section A-A from FIG. 5(*a*), beginning with section view 506(*a*), corresponding to view shown in FIG. 5(*b*). The next five views illustrate the progression of construction of support frame 105(*c*), from these first upper-most modules being connected 229 in section view 506(*a*), until the airship is completed in section view 506(*f*). These six illustrative views show the position of HOH support robots 505(*a*) and 505(*b*) along linear track 503(*c*) given the level of completion of airship 101 at the time; and the addition of two corresponding HOH support robots for each circular structural frame that is added as progression of the construction proceeds in the direction of arrow 504(*b*) in FIG. 5(*a*) from midline 104.

As shown in section views 506(*a*) and 506(*f*), respectively, HOH support robots 505(*a*) and 505(*b*) start and end closest together, near the middle of linear track 503(*c*). In section views 506(*b*), 506(*c*) and 506(*d*), HOH support robots 505(*a*) and 505(*b*) move farther apart as airship 101 is constructed, reaching their maximum separation at the "equator" (e.g., the halfway point between the top and bottom of the airship) of such assembly, illustrated in section view 506(*d*). As detailed in FIG. 6, HOH support robots 505 have a pivoting axis that enables the support arm to always accord with the curvature of circular frame 105. The rotation of this pivot axis by +/−90 degrees allows HOH support robots 505 to adapt to both concave and convex curvatures with respect to the build centerline. Accordingly, once the equator of the structure passes the build level, the support robots are rotated horizontally and rolled from inside to outside to complete the build. This is illustrated in section views 506(*a*)-506(*d*), showing HOH support robots 505(*a*) and 505(*b*) positioned on the inside of circular frame 105 in these earlier stages of construction, and showing such HOH support robots 505(*a*) and 505(*b*) moving to the outside of the build in section views 506(*e*) and 506(*f*) once the equator has been passed.

Although construction of airship 101 will begin with circular support frame 105(*c*) being assembled from linear track 503(*c*), as illustrated in section view 506(*a*) and FIG. 5(*b*), as the airship's construction progresses towards the equator, the assembly will also move in the direction of the front 102 and rear 103 of the structure. As the active areas where construction build is taking place moves laterally (e.g., in the direction of arrows 504(*a*) and 504(*b*), respectively), additional HOH support robots 505 will be added to each successive linear track, where such robots will function in the same manner as described with respect to those on linear track 503(*c*). Thus, as illustrated in section views 506(*d*) and 506(*e*), once construction of airship 101 reaches the equator, two HOH support robots 505 will be in use on each of linear tracks 503. Optionally, some or all of such HOH support robots 505 may remain in place to provide additional support, where necessary, once each such circular support frame 105 is completed, as shown in section view 506(*f*).

Figure 6A:
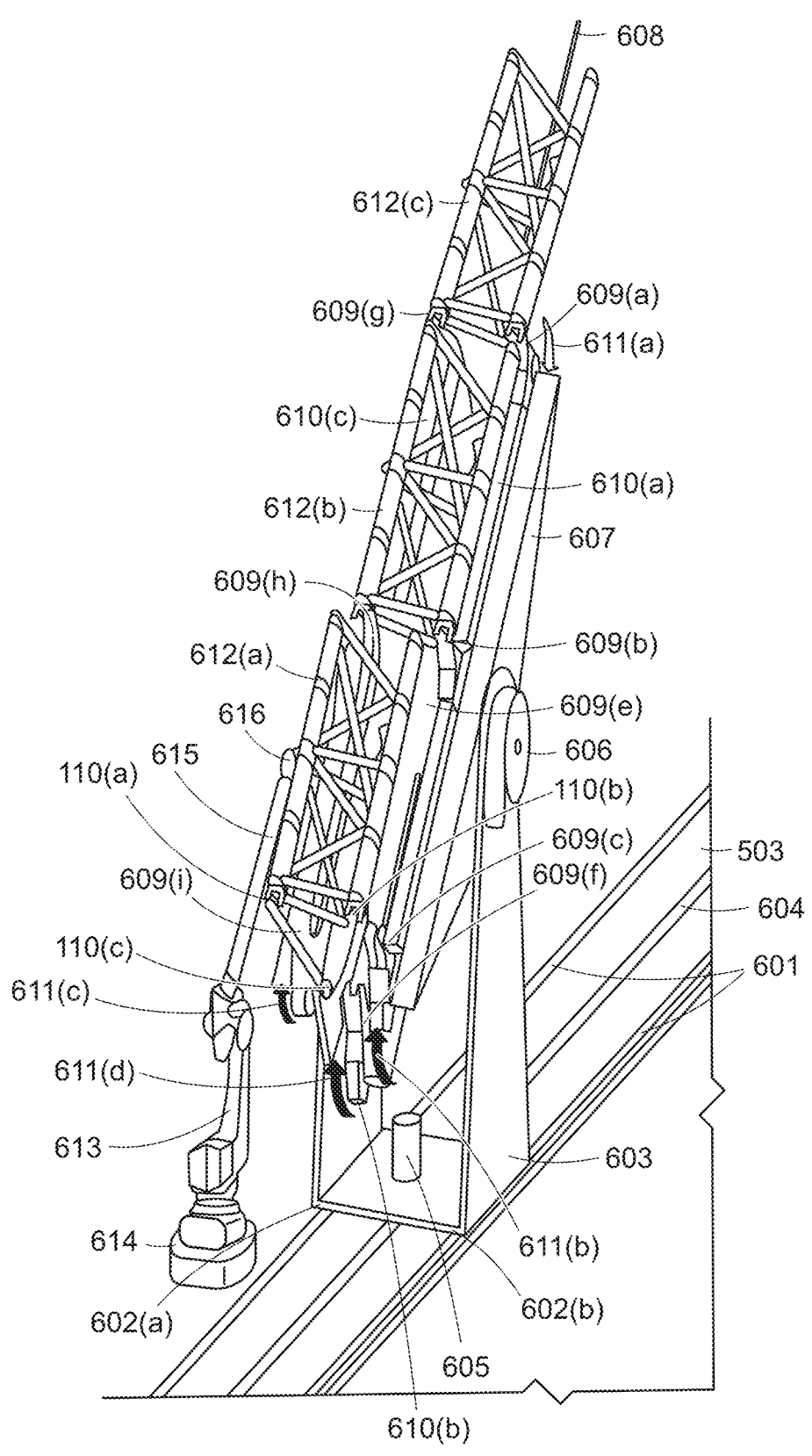
FIG. 6, including sub-parts 6(a) and 6(b), depicts in subpart 6(a) a perspective view of a heavy-lifter robot holding a partially completed section of a principal transverse frame while lifting the next modular segment of frame into place with the assistance of an autonomous assembly robot.
FIG. 6(b) illustrates additional classes of support robots, including a schematic illustration of a swarm of autonomous assembly and fixturing robots connecting sub-assemblies produced by other robot work cells in conjunction with the assistance of specialized autonomous robots for shuttling raw materials and sub-assemblies to the main assembly area.

Turning next to FIG. 6, a schematic illustration of such HOH support robots 505 is provided in FIG. 6(*a*). As shown, in a preferred embodiment, linear bearing rails 601 are attached to linear track 503. Although in one embodiment, HOH support robots 505 may not employ track mounting, in a preferred embodiment these mobile robots are track mounted because there are possible cases where there will be upward stresses (for example, during a positive buoyancy stress test) or high moment loads being transferred to the floor. Although the optional use of gas cells as disclosed with respect to FIG. 3 and FIG. 4 may provide some of this support for more heavy phases of the build, in a preferred embodiment, the HOH support robots 505 employ the conservative assumption that there is no such off-loading, thereby requiring HOH support robots to carry the entire weight of airship 101 by the time it is completely assembled.

Assuming that completed airship 101 weighs a total of 400,000 pounds, and assuming it has 16 structural frames 105, then eight (8) HOH support robots 505 will be employed on each side. In this instance, each HOH support robot 505 would need to support approximately 25,000 pounds, plus a safety factor to account for heavier weights in some areas and the possibility of buoyant off-loading. Although various methods of attachment are possible, the use of linear bearings 602(*a*) and 602(*b*) provides high load capacity, rigidity, and shock and impact resistance, while providing support for the load of the robot's carriage 603 during its movement along linear track 503 and provides a low friction sliding surface for the bearing rails 601. In an optional embodiment, carriage 603 may also be provisioned to extend upward (e.g., in a Y-axis direction) to support portions of the airship at one or both ends once construction of airship 101 has proceeded beyond the equator and construction of the corresponding circular support frame 105 for that portion of airship 101 is completed.

Persons of ordinary skill in the art will recognize that several methods can be used to drive robot's linear (e.g., X-axis) motion, including but not limited to belts, rack and pinion, and chain drives. As illustrated, in a preferred embodiment, HOH support robots 505 use rack 604 and traverse drive (pinion) 605. To reduce cabling, the power supply 204 for HOH support robots 505 will in a preferred embodiment employ on board batteries. Because these robots move only short distances at a time and sit idle during most of the assembly period, in a preferred embodiment a trickle charge may be provided through the linear bearings for topping off the on-board batteries.

As described with respect to FIG. 5(b), HOH support robots 505 are heavy lift devices with a pivoting axis 606 to allow the robot's arm assembly 607 to rotate +/−90 degrees so that it is oriented in accordance with the build centerline 608 for its respective circular structure frame 105 and thereby to accommodate both concave and convex curvatures as the airship build progresses. In a preferred embodiment, such pivoting arm assembly 607 provides gripping 218, lifting 226, and holding in place 227 functions. Assuming the use of triangular shaped trusses to construct circular structure frames 105, in a preferred embodiment, such arm assembly 607 contains a total of nine node grippers 609 mounted in sets of three node grippers each, on recirculating tracks 610 with drive means.

Node grippers 609(a), 609(b) and 609(c) are shown as connected to recirculating track 610(a); node grippers 609 (d), 609(e) and 609(f) are connected to recirculating track 610(b) (with node gripper 609(d) being hidden behind other portions of the illustration); and node grippers 609(g), 609(h) and 609(i) are connected to recirculating track 610 (c). Arrows 611(a) and 611(b) indicate the direction that recirculating track 610(a) moves when HOH support robot 505 lifts the truss modules 106 it is gripping (as hereinafter described) and in turn lifts the structural frame 105 these modules comprise; and arrows 611(c) and 611(d) respectively show the return of recirculating tracks 610(b) and 610(c) and their corresponding node grippers 609.

Three truss modules 106 are shown in various stages of assembly into their corresponding structural frame 105. As illustrated, truss module 612(a) is being moved into position by assembly and fixturing robot (FixBot) 613, the features of which are described below. As shown, FixBot 613 is positioning coupling joints 110(a), 110(b) and 110(c) of truss module 612(a) into, respectively, gripping node 609(i) on recirculating track 610(c), gripper node 609(f) on recirculating track 610(b), and gripper node 609(c) on recirculating track 610(a). Once properly positioned, in a preferred embodiment FixBot 613 (or a second FixBot with the appropriate end of arm tooling 213 for attaching these coupling joints in the desired manner) connects the corresponding three coupling joints 111(a), 111(b) and 111(c) of truss module 612(a) to coupling joints 110(a), 110(b) and 110(c) of truss module 612(b). Gripper nodes 609(h), 609 (e), and 609(b) then grip onto the connected joint between truss modules 612(a) and 612(b), thereby holding these modules firmly in place 227 while work proceeds on the layer corresponding to truss module 612(c), including connecting the rest of the structural elements and skin as described with respect to FIG. 6(b), and connecting other components of airship 101 for that layer of assembly.

When all components of the layer have been completed, gripping nodes 609(a), 609(d) and 609(g) will open, thereby releasing the last hold on truss module 612(c), and recirculating tracks 610(a), 610(b) and 610(c) will lift truss modules 612(a) and 612(b), thereby indexing upward the corresponding structural frame 105 comprised of truss modules 610(a), 610(b) and 610(c), the corresponding three truss modules 106 on the opposite side of airship 101, and all of the truss modules 106 connecting between them. A similar action will simultaneously be performed by HOH support robot 505 pairs holding any other circular frames 105, thereby raising the entire structure 101. Once this is complete, the foregoing sequence of steps will be repeated until construction of the entire structural frame, attachment of its skin, and connection of associated components is completed.

It will be apparent to persons of ordinary skill in the art that the actions of any HOH support robots 505 in contact with the airship 101 structure must be coordinated to ensure that such structure 101 will be raised in the desired manner. HOH support robots 505 will have identical stop and start times, but different rates. To ensure proper action, all HOH support robots 505 will be finely coordinated by the system's control systems 205, pre-programmed assembly techniques 214, and communications 211, with the failure of any recirculating track 610, gripper node 609, traverse drive 605 or pivot drive 606 to function in the expected manner resulting in immediately halting the actions of all HOH support robots 505 until such fault has been diagnosed and corrected.

As indicated above, FixBots 613 are a light payload robot that is programmed to hold sub-assemblies such as truss modules 106 in place. Each an autonomous guided vehicle (AGV), such FixBots 613 are also used throughout the manufacturing facility for other materials handling and placement duties. To enable FixBots 613 to travel autonomously without an onboard operator or driver, they are constructed on an autonomous mobile robot (AMR) base 614 such as those manufactured by Bosch Rexroth. And to perform a broad range of tasks, each such FixBot 613 has a six-axis articulating arm 615, such as manufactured by FANUC, Yaskawa Motoman, ABB, and KUKA, and is equipped with end of arm tooling 213 to perform its tasks and camera 616 to read fiducials of destination and part-in-grasp in order to position such sub-assemblies accurately as well as to perform inspections.

Figure 6B:
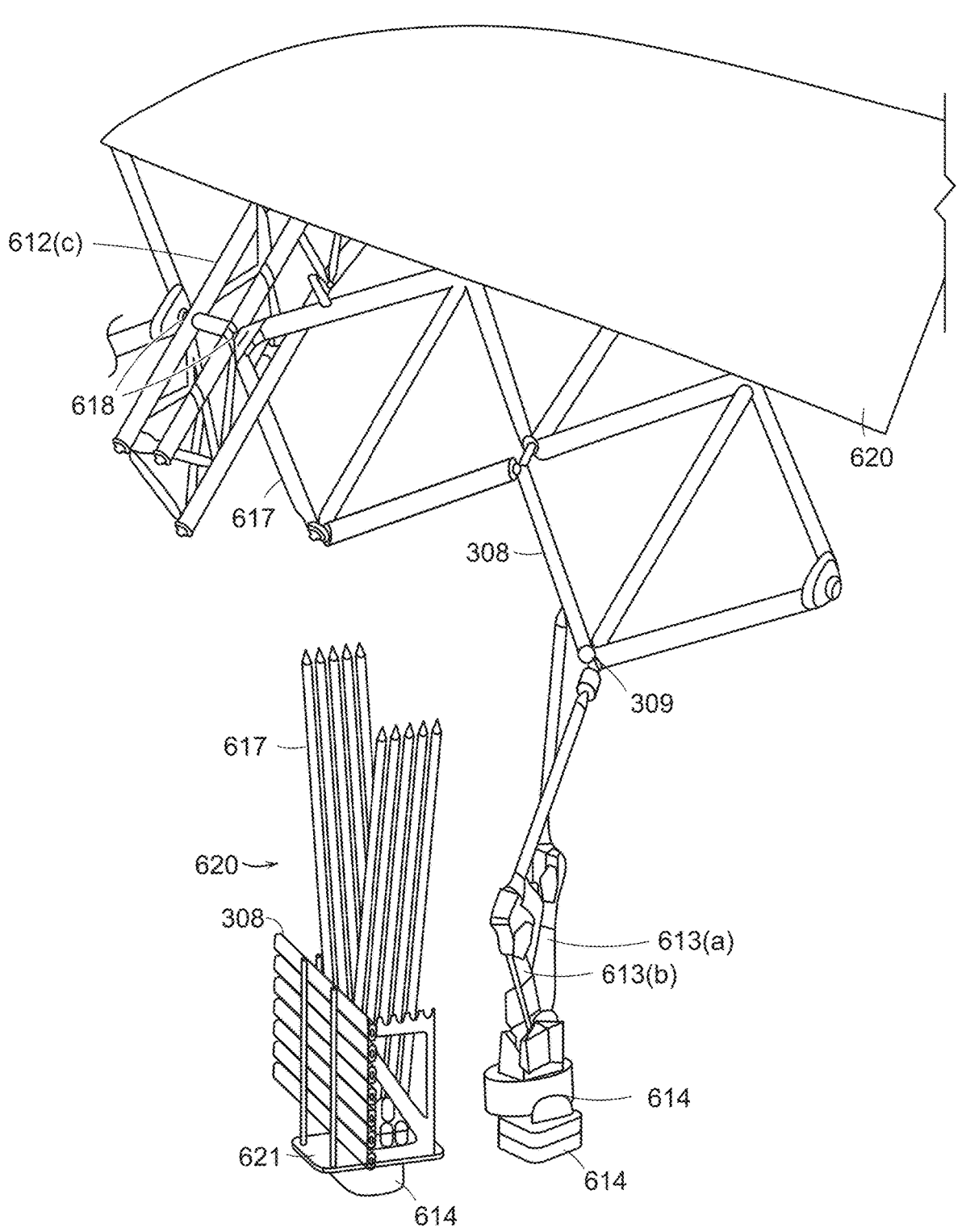

Turning next to FIG. 6(b), FixBots 613(a) and 613(b) are shown equipped with different end of arm tooling that equips them to assemble and connect the structural elements between circular structural frames 105. By way of a non-limiting example of operating as a robot swarm, FixBot 613(a) is shown holding spoke 308 in place while FixBot 613(b) connects it at a hub 309 to other spokes. The figure also illustrates other sub-assemblies 617 that are connected to truss module 612(c) with connectors 618, and the attachment of skin 619 onto such exoskeleton. FIG. 6(b) also shows another specialized class of robots, called FetchBots 620, that may be used in a preferred embodiment to shuttle raw materials such as pre-cut lengths of spokes 308 and pre-assembled components such as sub-assemblies 617 to the main assembly floor from other areas of the facility where these components are produced, inventoried, and otherwise prepared by robot work cells. As shown, such FetchBots contain an AMR base 614 and specialized truck 621 for holding such raw materials and sub-assemblies.

In a preferred embodiment, all the assembly steps, processes involved in attaching 230 laying up or 3D printing 212 the skin and assuring the finished surface is appropriately formed and smooth, and other steps involved in manufacturing the airship will be carried out in a similar manner. As this work is performed, the base robotic capabilities 202 can also be used to provide automated quality oversight through inspections 233 and/or by enabling human supervision of such robotic activity through use of machine vision 209 and communication 211 with a remote screen used by said supervisor from the factory floor, a control room, or observing from a remote location. The combination of experienced technicians overseeing in real time and/or by asynchronously observing photographs 234 of such robotic activity performed in accordance with the disclosed system and method will yield superior performance results in a fraction of the time, and at a fraction of the cost of traditional construction approaches.

Moreover, based on the foregoing disclosures, it will also be apparent to persons of ordinary skill in the art how the requirements of the factory infrastructure in which such assembly takes place can simultaneously be reduced. While a large physical structure is still required for such operations to be shielded from the elements and in a protected environment, the disclosed system, method and apparatus permits the project sponsor to avoid the need for very costly elevated construction platforms, one or more huge overhead cranes, and the additional foundations, heavily reinforced structures, and associated building infrastructure to support such elements as would otherwise be required when employing traditional manufacturing techniques.

Using the foregoing disclosures, without needing to perform undue research, robotics suppliers such as KUKA, ABB (ASEA Brown Boveri), Omron Adept Technologies, Mitsubishi Electric, Bosch, Yaskawa, Kawasaki, Nachi-Fujikoshi, Comau Robotics, Yamaha, IGM, Rethink Robotics, Arrival, and others can provide robots and control systems 205 able to carry out all the base automated operations 203. Such suppliers will also be enabled to compose assembly techniques 314 from CAD drawings provided by the airship designers that such robots can use to perform the tasks required to assemble exoskeleton 101 and complete other manufacturing steps in accordance with the principles of this disclosure. It will be apparent to persons of ordinary skill in the art how, by following such computer controlled, pre-programmed assembly techniques 214, and/or utilizing machine learning/AI 215, such robots may be trained to respond to different structural shapes, systems, parts numbering schemas, tags, and markings for each such manufacturing project.

In another preferred embodiment, these robots can utilize machine vision 209 and machine learning 215 to adapt to the geometry of the airship exoskeleton 101, and perform other specialized tasks needed to construct the airship. In addition to labor savings and safety benefits, and the ability to reduce the capital cost of manufacturing facilities and the need for specialized equipment, the disclosed system and method are also designed with manufacturing speed and scalability in mind. For example, the time required for construction can be accelerated by assigning additional robots to work in a coordinated fashion on specific tasks, or by employing additional "teams" of robots that are programmed to work in parallel on different parts of the airship, thereby making it possible to readily scale-up production levels to meet the desired project duration goals virtually regardless of the size of the airship and the number of airships. In addition, by duplicating assembly techniques 214, additional manufacturing facilities can be readily developed in other geographic areas, thereby making it possible to expand the number of assembly locations and rapidly enter multiple markets, create good paying jobs, and add to local tax revenue-all of which will assist in building broad community support and adoption.

In summary, based on the foregoing disclosures, it will be apparent to persons of ordinary skill in the art how by using bottom up assembly methods, top down assembly methods, and/or useful combinations of the two methods, multiple teams of robot-based work cells producing raw materials and sub-assemblies, FetchBots 620, and FixBots 613, can work in tandem with HOH support robots 505, and robots equipped to climb, to construct airships in a faster, less costly, higher quality, and significantly more replicable and scalable manner than in the prior art, while simultaneously overcoming the stated limitations of such prior art methods.

From the foregoing disclosure, it will be appreciated that, although specific implementations have been described herein for purposes of illustration, various modifications may be made without deviating from the spirit and scope of the appended claims and the elements recited therein. In addition, while certain aspects have been presented as alternative, optional or preferred embodiments, all such embodiments are not required and thus may be incorporated as dictated by the circumstances to achieve the desired result. Moreover, while certain aspects are presented below in certain claim forms, the inventors contemplate the various aspects in any available claim form. Various modifications and changes may be made as would be obvious to a person skilled in the art having the benefit of this disclosure. It is intended to embrace all such modifications and changes, and accordingly, the above description should be regarded in an illustrative rather than restrictive sense.

What is claimed is:

1. A method of robotically manufacturing an aerospace asset from the top down, the method comprising:

placing a partially completed assembly of said aerospace asset onto at least one truss held by at least one supporting robot;

using one or more specialized robot worker classes to complete a construction task cycle on a selected work surface of said partially completed assembly thereby completing a construction task cycle on upper sections of the aerospace asset;

robotically elevating the active assembly work surface of said partially completed assembly with at least one supporting lift robot;

selecting a further lower active assembly work surface and robotically completing a construction task cycle on said further selected lower assembly work surface; and repeatedly elevating subsequent lower active assembly work surface and robotically completing a construction task cycle on subsequent selected lower active assembly work surfaces until the aerospace asset has been fully constructed.

2. The method of claim 1 wherein the at least one supporting robot is capable of adjusting the point of contact of the at least one truss with the aerospace asset according to the position and curvature of a frame of the aerospace asset.

3. The method of claim 1, wherein the construction task cycle on the aerospace asset is performed by one or more robots working independently or within a robotic swarm.

4. The method of claim 3, wherein the robotic swarm comprises at least one supporting robot in communication with one or more another supporting robot in order to correctly orient themselves according to the construction task in the assembly of the aerospace asset.

5. The method of claim 3, wherein the robotic swarm comprises multiple robots that are either homogeneous and heterogeneous or mixtures thereof forming a swarm of robots, wherein individual robots within the robotic swarm have processing, communication and sensing capabilities allowing said robots to interact with each other and to accomplish the construction task cycle.

6. The method of claim 1, wherein the robotic swarm comprises at least one heavy lift robot in conjunction with other specialized robots to complete the construction task cycle of the aerospace asset.

7. The method of claim 1, wherein an outside surface material of the aerospace asset is applied by specialized homogeneous robots within the robotic swarm.

8. The method of claim 1, wherein each of the at least one robot comprising said robotic swarm is controlled by pre-programmed routines, artificial intelligence, or a combination thereof.

9. The method of claim 8 wherein robots within the robotic swarm utilize remote cameras, computer vision, and machine learning to perform specific and unique functions when completing construction task cycles of the frame, exoskeleton, covering, or other portions of the aerospace asset.

10. The method of claim 9, wherein each robot attaches itself to and derives support from one or more components that have already been assembled.

\*  \*  \*  \*  \*